United States Patent
Lee et al.

(10) Patent No.: US 10,986,576 B2
(45) Date of Patent: Apr. 20, 2021

(54) METHOD AND APPARATUS FOR TRANSMITTING AND RECEIVING DATA IN WIRELESS COMMUNICATION SYSTEM

(71) Applicant: LG ELECTRONICS INC., Seoul (KR)

(72) Inventors: Ki-Dong Lee, San Diego, CA (US); Sanggook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 16/347,169

(22) PCT Filed: Nov. 3, 2017

(86) PCT No.: PCT/KR2017/012429
§ 371 (c)(1),
(2) Date: May 2, 2019

(87) PCT Pub. No.: WO2018/084644
PCT Pub. Date: May 11, 2018

(65) Prior Publication Data
US 2020/0267650 A1   Aug. 20, 2020

Related U.S. Application Data

(60) Provisional application No. 62/417,279, filed on Nov. 3, 2016.

(51) Int. Cl.
*H04W 52/02* (2009.01)
*H04W 16/14* (2009.01)
(Continued)

(52) U.S. Cl.
CPC ....... *H04W 52/0229* (2013.01); *H04W 16/14* (2013.01); *H04W 48/08* (2013.01); *H04W 84/12* (2013.01)

(58) Field of Classification Search
CPC . H04W 52/0229; H04W 16/14; H04W 48/08; H04W 84/12
See application file for complete search history.

(56) References Cited

U.S. PATENT DOCUMENTS

2008/0081651 A1* 4/2008 Kuroda ............... H04L 1/1893
455/509
2009/0092111 A1* 4/2009 Horn .................. H04W 48/02
370/338

(Continued)

FOREIGN PATENT DOCUMENTS

KR   10-2016-0030035 A    3/2016

OTHER PUBLICATIONS

Richard Burbidge, "LTE-WLAN Aggregation (LWA) and LTE WLAN Radio Level Integartion with IPsec Tunnel (LWIP)", Mar. 2016 (Year: 2016).*

(Continued)

*Primary Examiner* — Andrew Lai
*Assistant Examiner* — Sumitra Ganguly
(74) *Attorney, Agent, or Firm* — Dentons US LLP

(57) ABSTRACT

Disclosed herein is a method for transmitting and receiving data using an LTE-WLAN aggregation in a wireless communication system. The method performed by a terminal comprises transmitting status information to an access point (AP), receiving a specific packet for indicating an activation of the wireless LAN module from the AP, activating the wireless LAN module based on the specific packet, transmitting a response message indicating that the wireless LAN module is activated in response to the specific packet to the AP, and receiving downlink data through an unlicensed spectrum using the LTE-WLAN aggregation from AP.

9 Claims, 12 Drawing Sheets

(51) Int. Cl.
*H04W 48/08* (2009.01)
*H04W 84/12* (2009.01)

(56) References Cited

U.S. PATENT DOCUMENTS

| | | | |
|---|---|---|---|
| 2011/0093571 A1* | 4/2011 | Gorg | H04W 8/085 |
| | | | 709/220 |
| 2011/0222523 A1 | 9/2011 | Fu et al. | |
| 2013/0212255 A1* | 8/2013 | Chao | H04L 67/22 |
| | | | 709/224 |
| 2014/0293970 A1 | 10/2014 | Damnjanovic et al. | |
| 2016/0302064 A1 | 10/2016 | Tsai et al. | |
| 2017/0118133 A1* | 4/2017 | Meylan | H04W 88/06 |
| 2018/0020405 A1* | 1/2018 | Huang | H04W 52/0229 |
| 2018/0324899 A1* | 11/2018 | Sivavakeesar | H04W 8/22 |

OTHER PUBLICATIONS

Richard Burbidge, "Liaison from 3GPP on LWA and LWIP", IEEE 802.1116/351r1, Mar. 14, 2016.

\* cited by examiner

[Fig. 1]
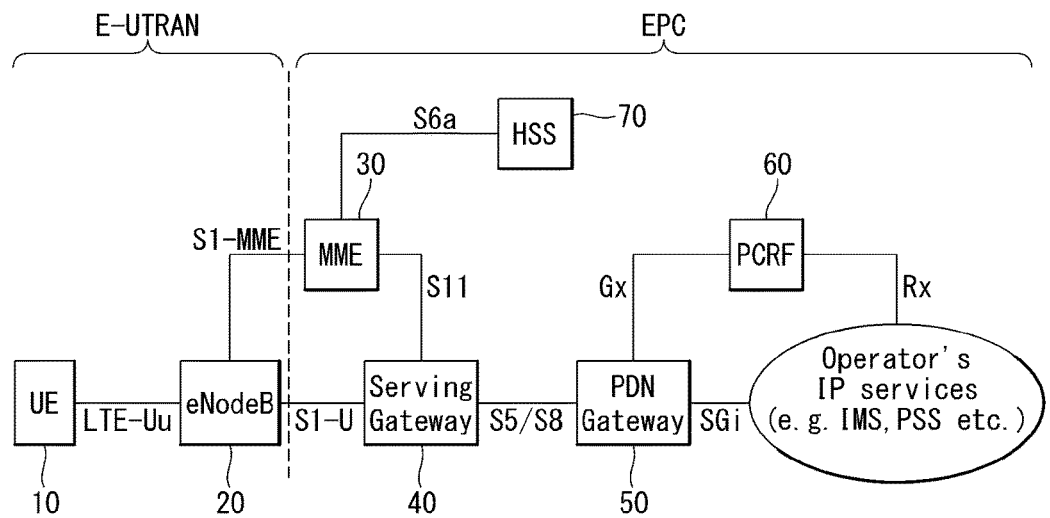
[Fig. 2]
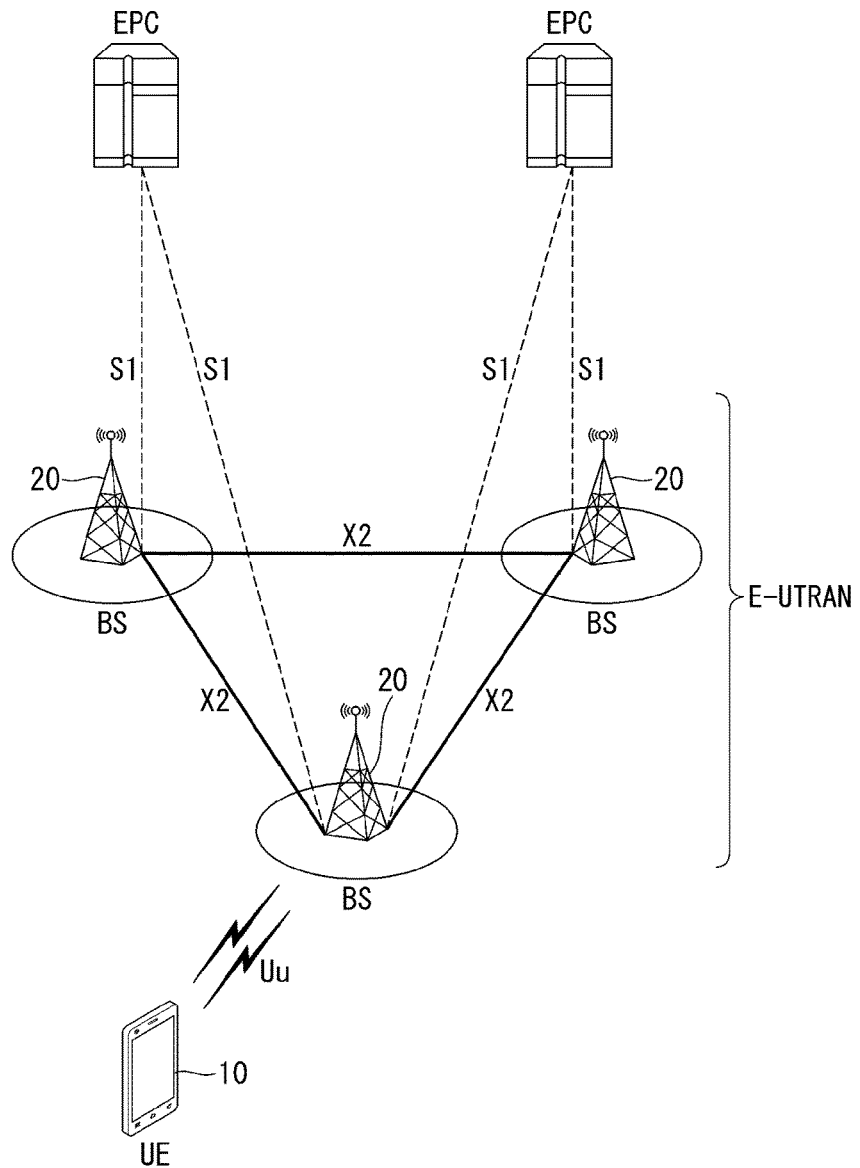

[Fig. 3]
(a) 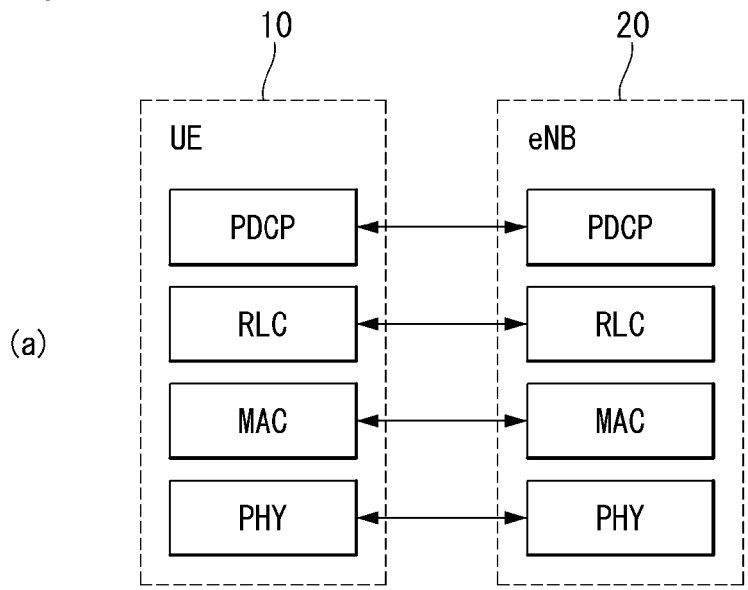
(b) 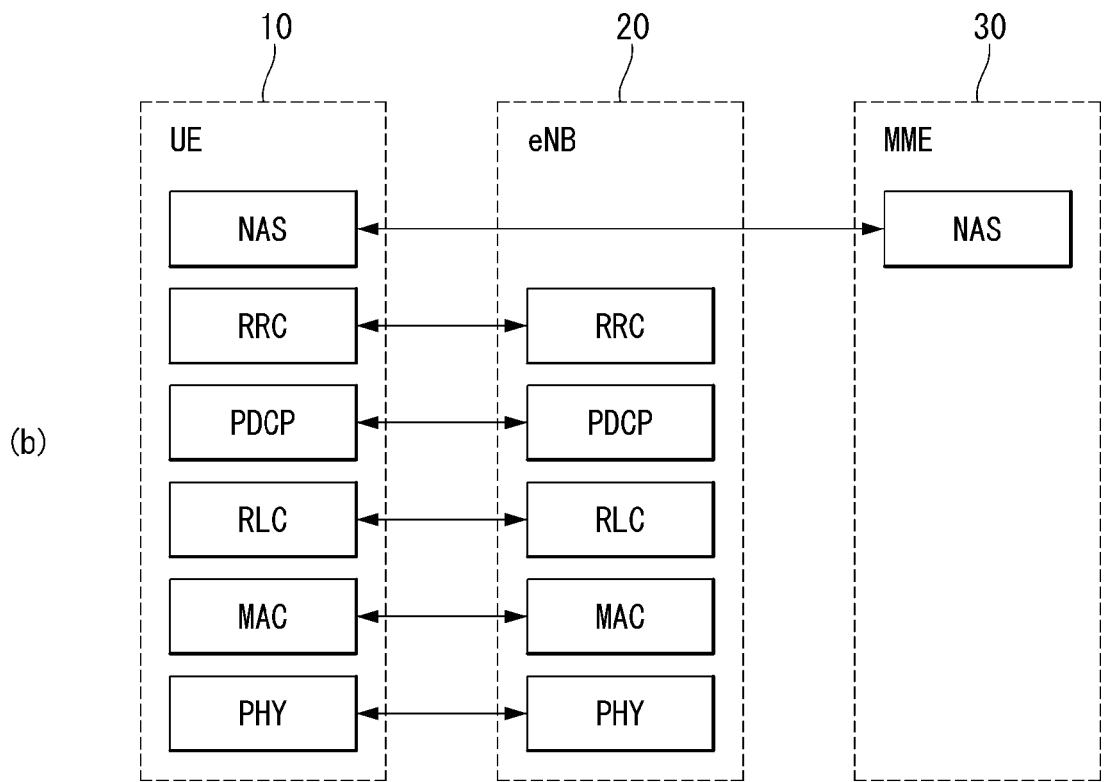

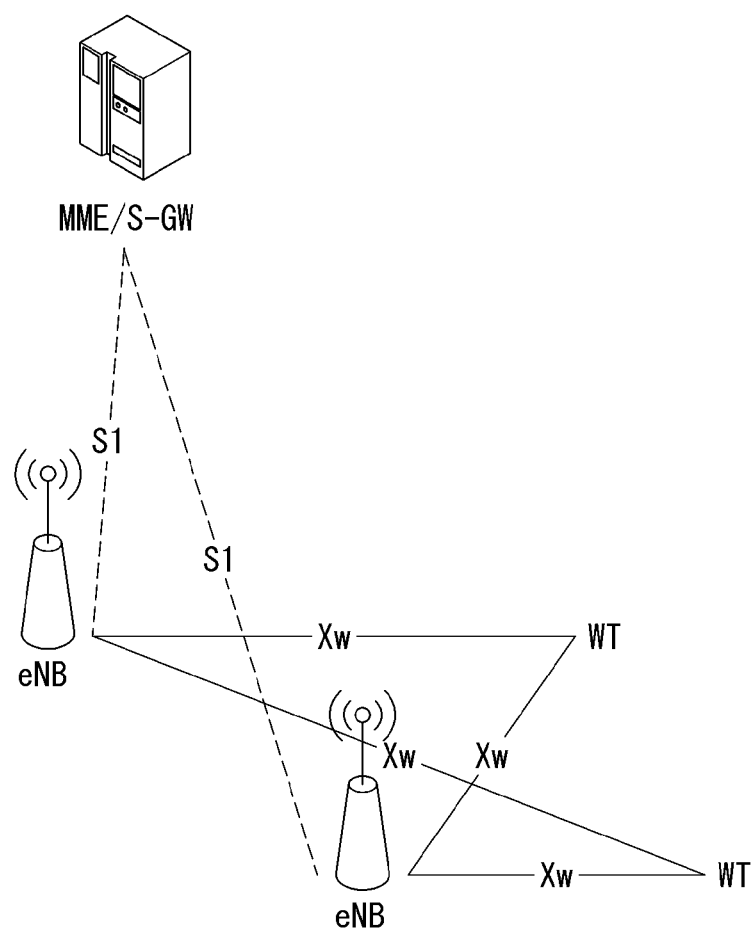
[Fig. 4]

[Fig. 5]
(a)
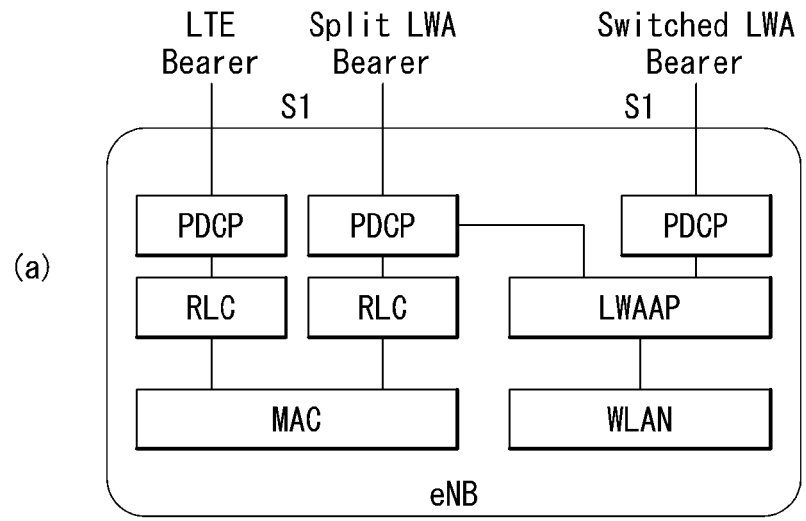
(b)
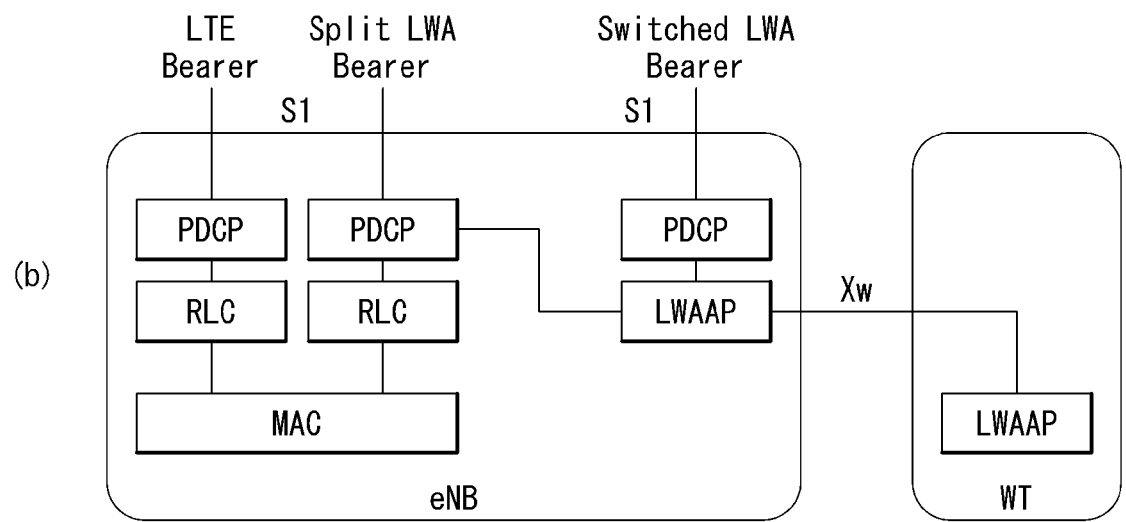

[Fig. 6]
(a)
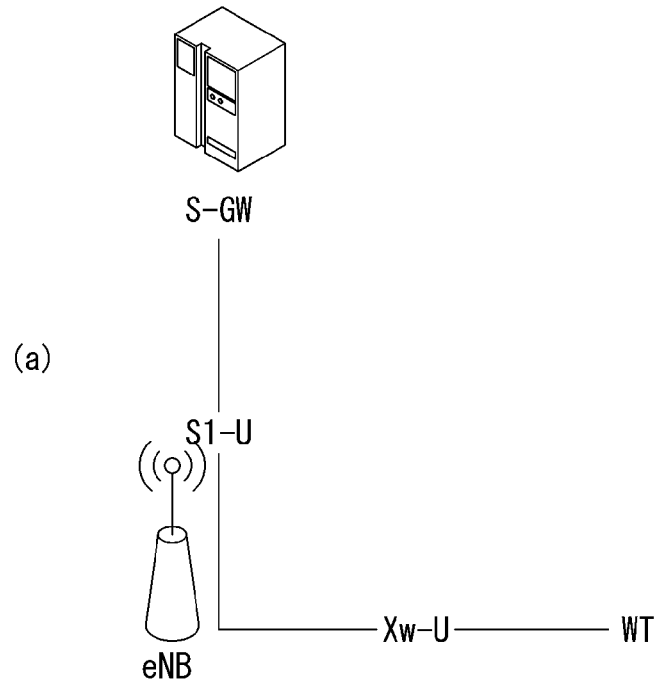
(b)
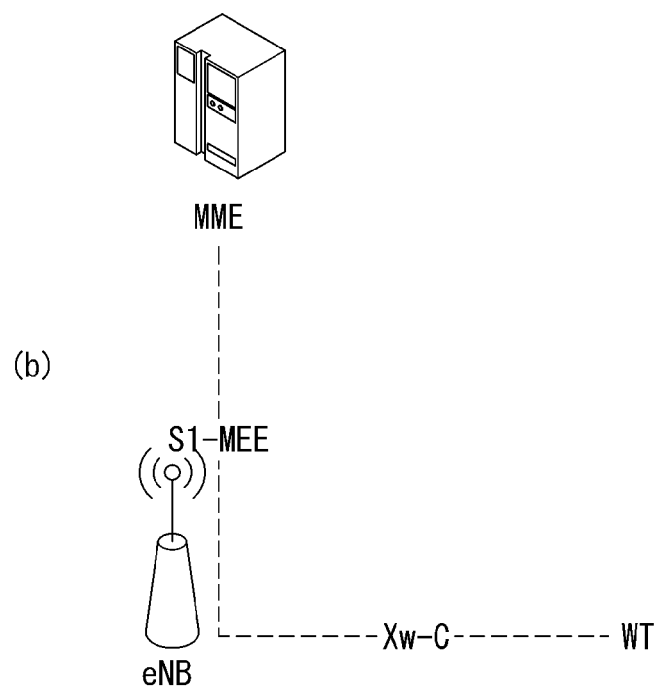

[Fig. 7]
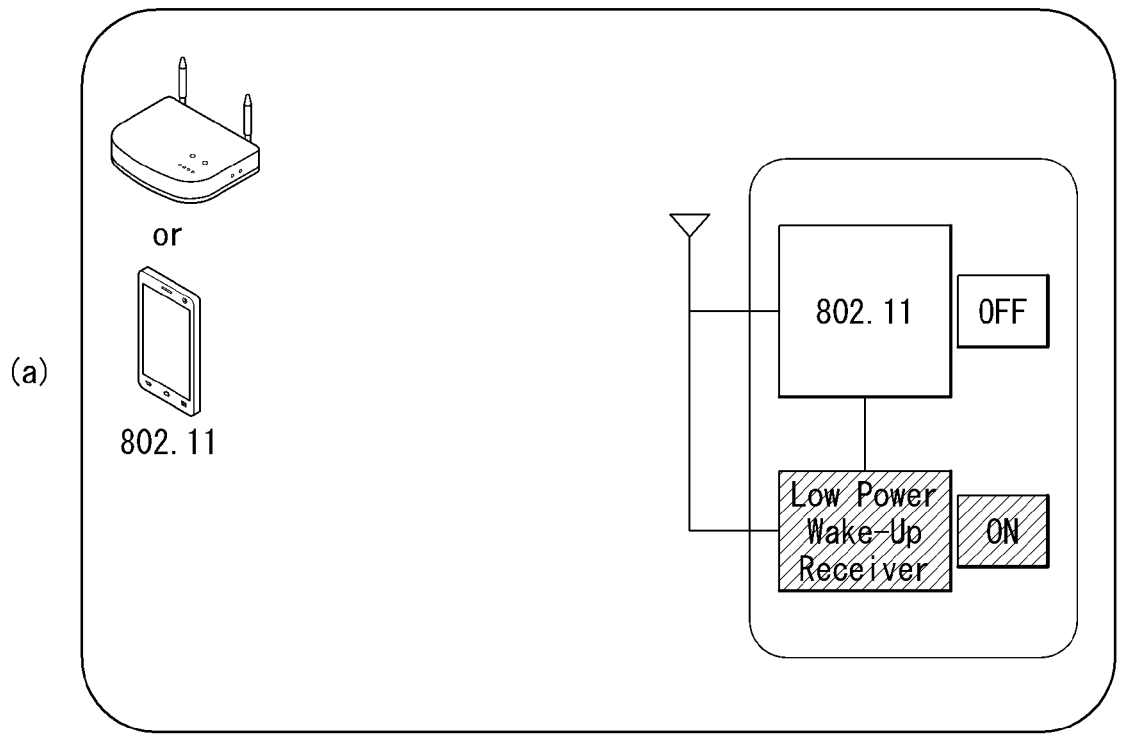
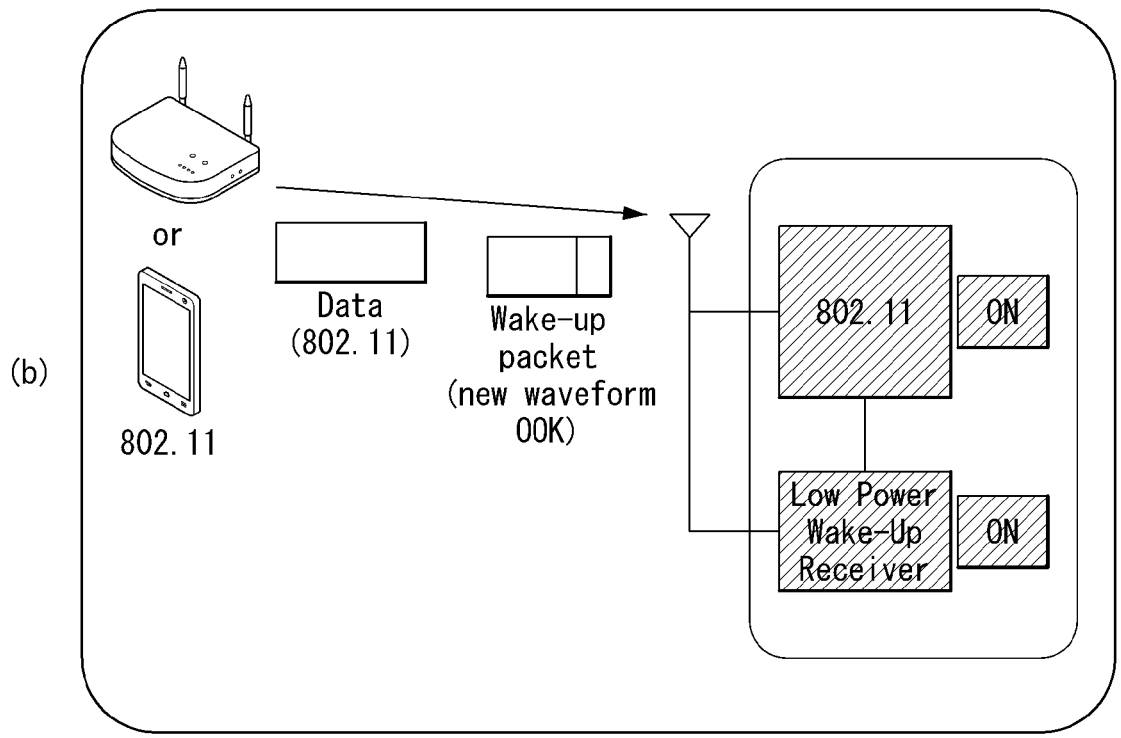

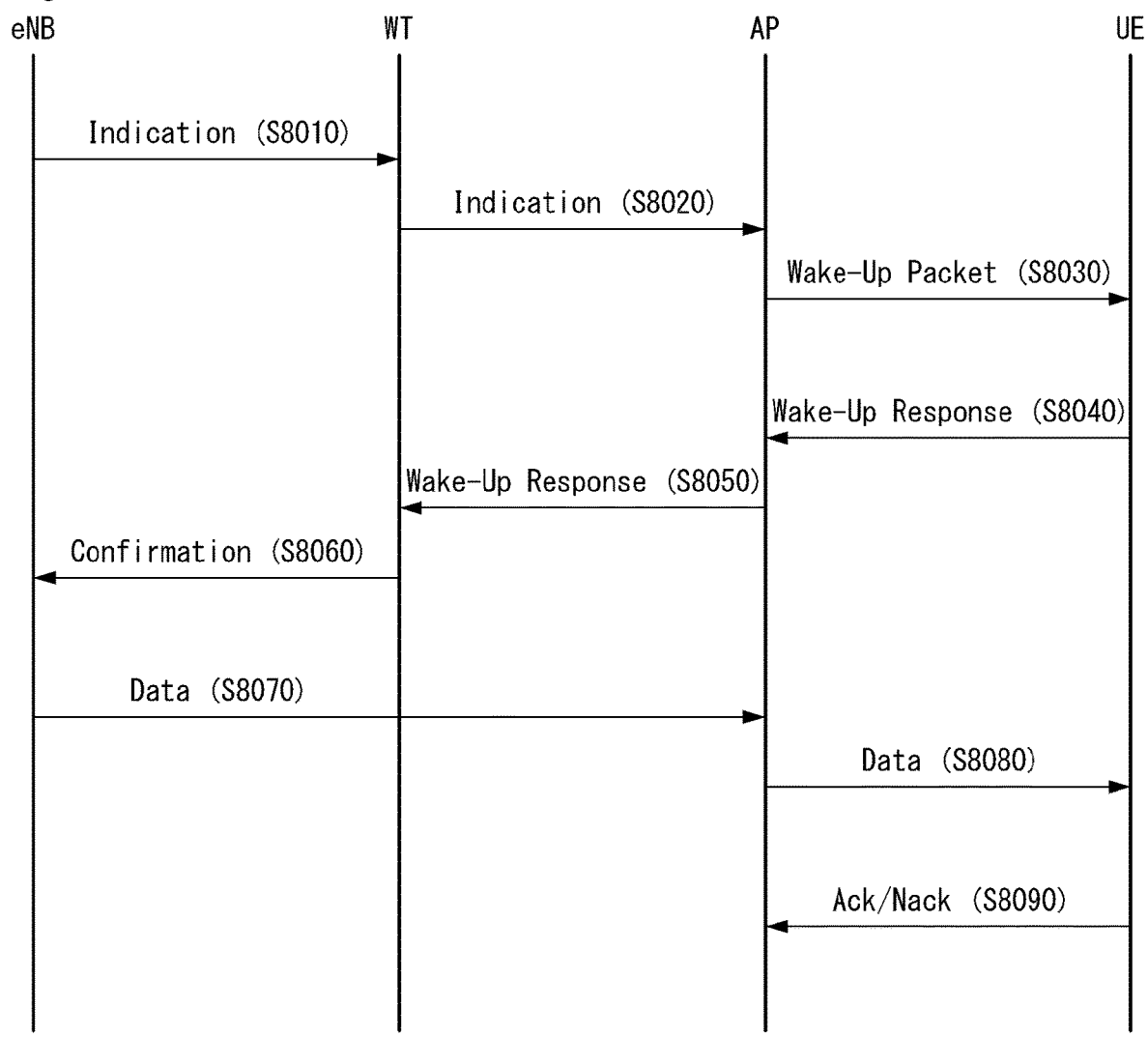

[Fig. 9]
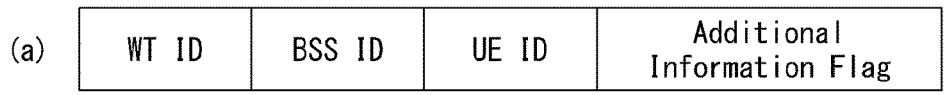
(a)
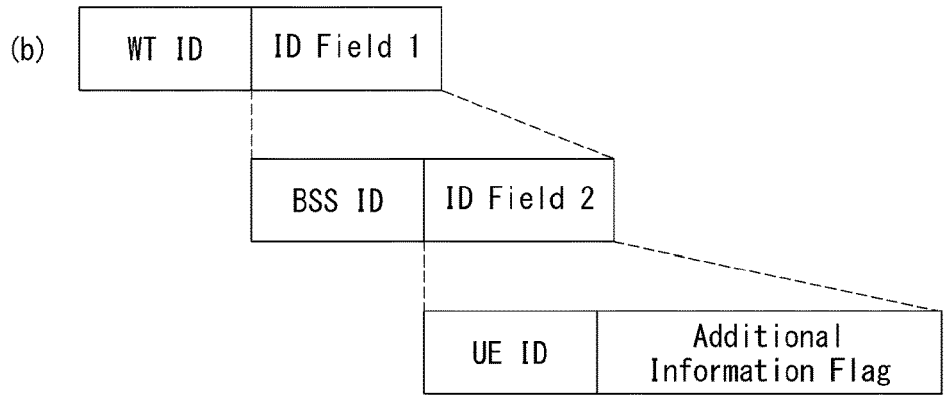
(b)
(c)
[Fig. 10]
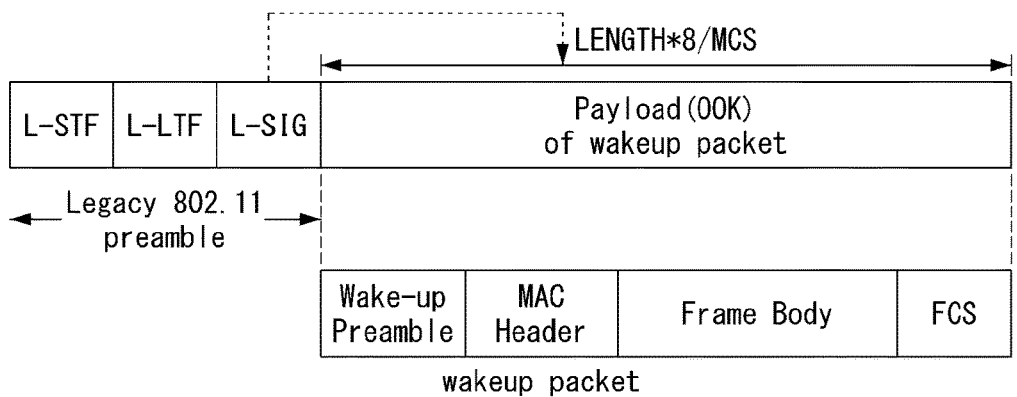

[Fig. 11]
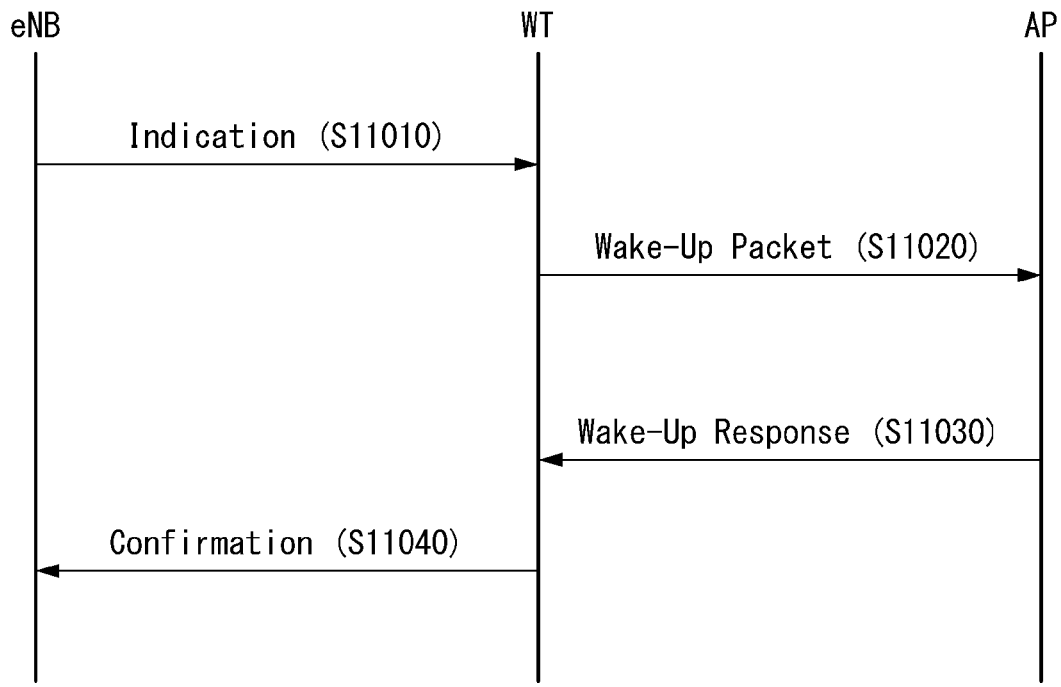
[Fig. 12]
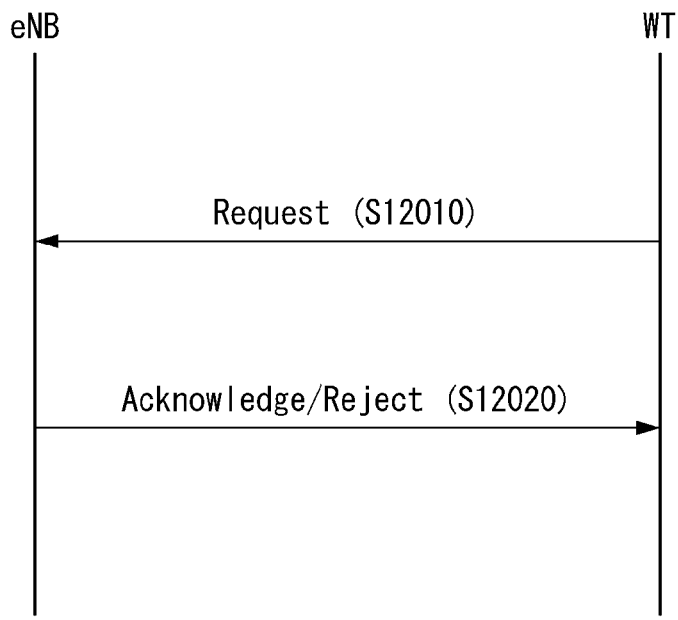

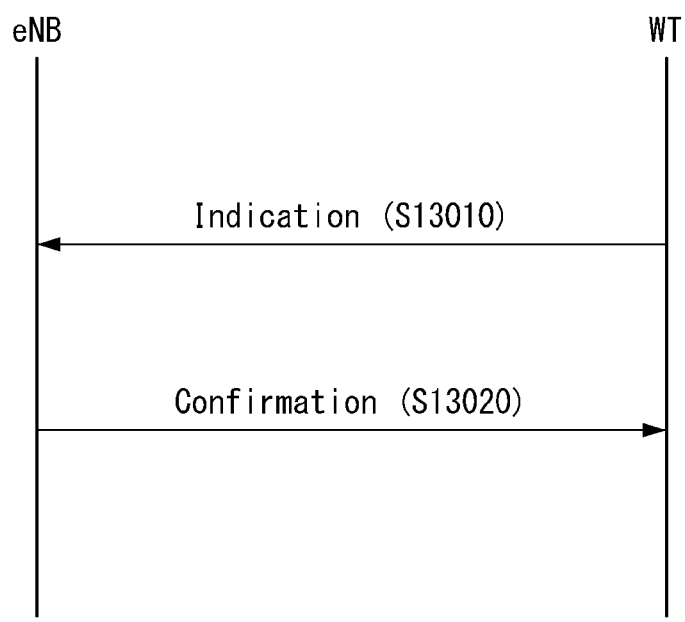
[Fig. 13]

[Fig. 14]
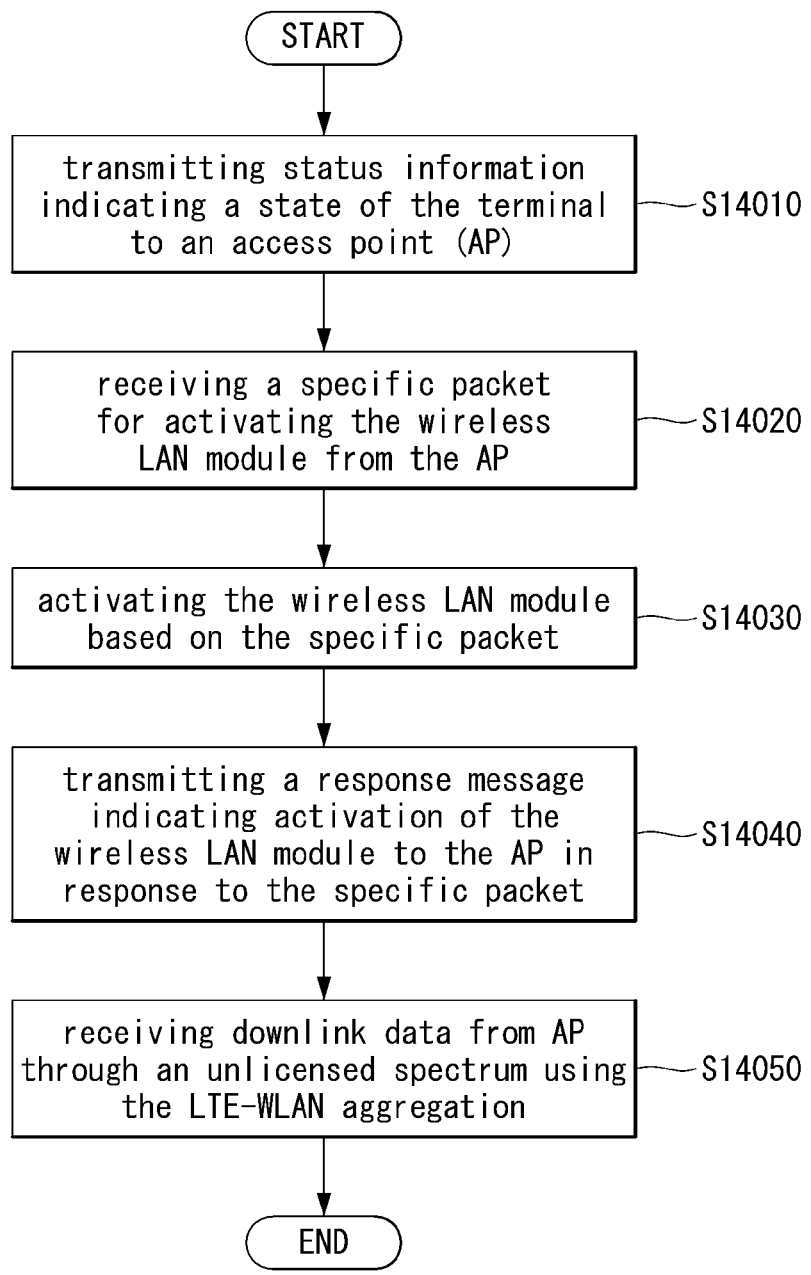

[Fig. 15]
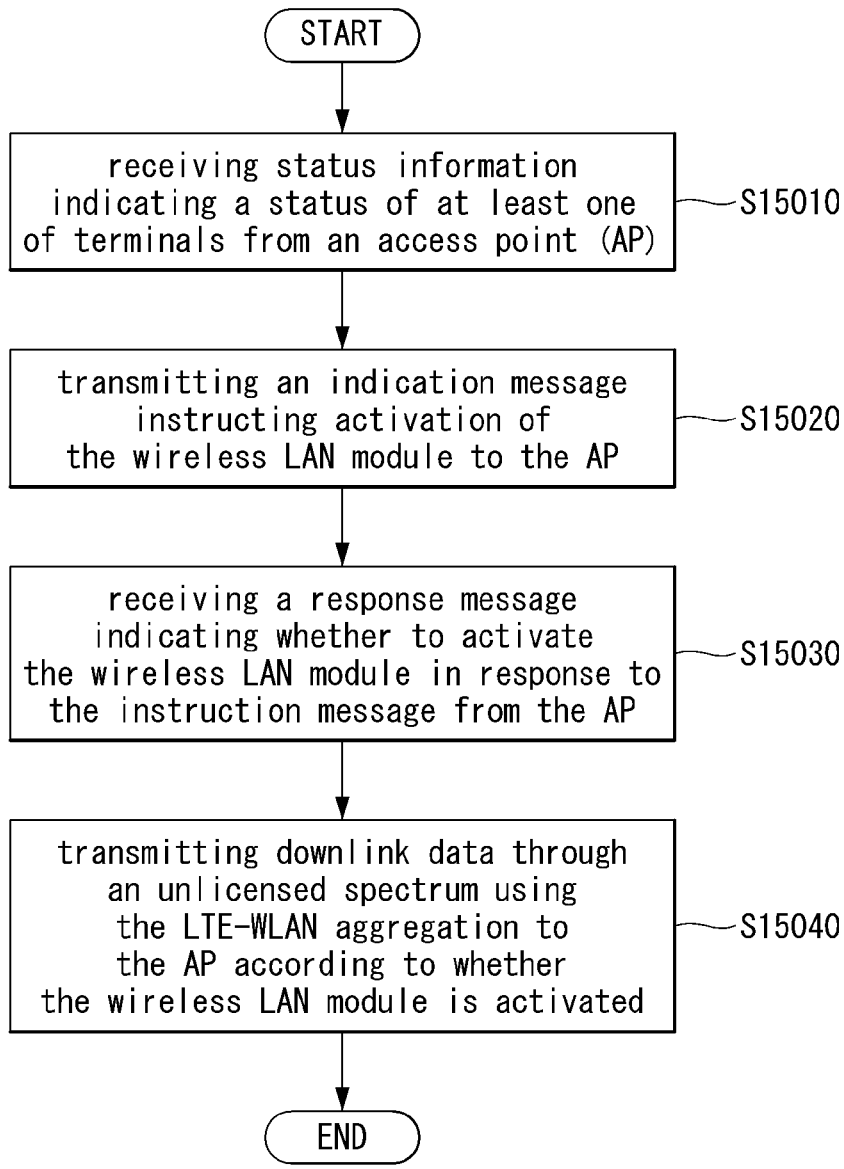
[Fig. 16]
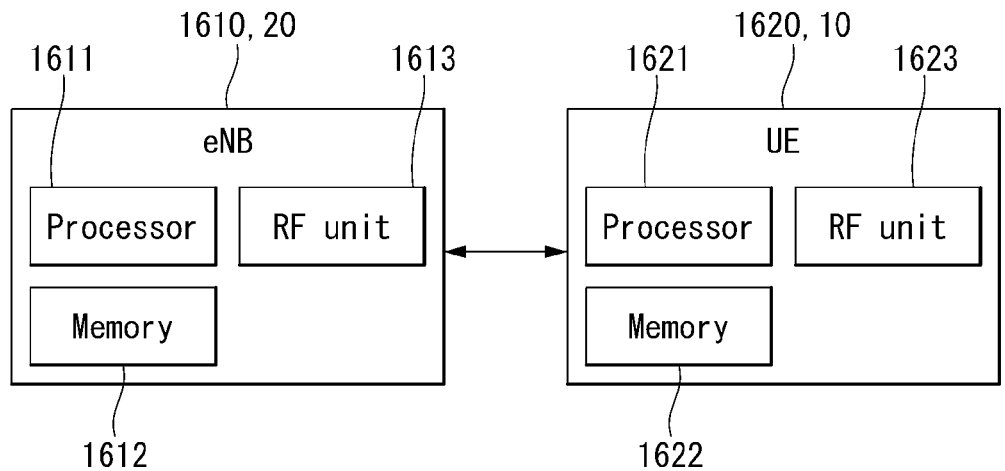

METHOD AND APPARATUS FOR TRANSMITTING AND RECEIVING DATA IN WIRELESS COMMUNICATION SYSTEM

CROSS-REFERENCE TO RELATED APPLICATIONS

This application is the National Stage filing under 35 U.S.C. 371 of International Application No. PCT/KR2017/012429, filed on Nov. 3, 2017, which claims the benefit of U.S. Provisional Application No. 62/417,279, filed on Nov. 3, 2016, the contents of which are all hereby incorporated by reference herein in their entirety.

TECHNICAL FIELD

The present invention relates to a method for sending or receiving, by a UE, data in a wireless communication system and, more particularly, to a method and apparatus for sending or receiving data using an unlicensed band.

BACKGROUND ART

Mobile communication systems have been developed to provide voice services while assuring users' activities and mobility. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support including unlicensed bands, or device networking.

DISCLOSURE

Technical Problem

An embodiment of the present invention provides a method and apparatus for sending or receiving data through an unlicensed band using an LTE-WLAN aggregation.

Furthermore, an embodiment of the present invention provides a method and apparatus for activating a Wi-Fi module only when data to be transmitted or received is generated through a receiver having low power consumption.

Furthermore, an embodiment of the present invention provides a method and apparatus for sending or receiving data depending on the state of UEs by reporting the state of the UEs through an AP which manages the UEs.

Objects to be achieved in this specification are not limited to the aforementioned advantages, and those skilled in the art to which the present invention pertains may evidently understand other objects from the following description.

Technical Solution

In this specification, A method for transmitting and receiving data using an LTE-WLAN aggregation by a terminal in a wireless communication system, the method comprising: transmitting status information to an access point (AP), wherein the status information indicates that a wireless LAN module of the terminal is changed over to a OFF state after the terminal transmits the status information; receiving a specific packet for indicating an activation of the wireless LAN module from the AP; activating the wireless LAN module based on the specific packet; transmitting a response message indicating that the wireless LAN module is activated in response to the specific packet to the AP; and receiving downlink data through an unlicensed spectrum using the LTE-WLAN aggregation from AP.

Furthermore, in this specification, the response message includes a basic service set identifier (BSSID) for identifying the AP and a terminal identifier for identifying the terminal.

Furthermore, in this specification, the downlink data is transmitted through a specific bearer configured to transmit and receive data using the LTE-WLAN aggregation, and includes an identifier for identifying the specific bearer.

Furthermore, in this specification, A method for transmitting and receiving data using a base station in an LTE-WLAN aggregation by the base station in a wireless communication system, the method comprising: receiving status information from an access point (AP), wherein the status information indicates that a wireless LAN module of at least one of terminals is changed over to a OFF state after the at least one of terminals transmits the status information; transmitting a indication message indicating activation of the wireless LAN module to the AP; receiving a response message indicating whether the wireless LAN module is activated in response to the indication message from the AP; and transmitting downlink data through an unlicensed spectrum using the LTE-WLAN aggregation according to whether the wireless LAN module is activated to the AP.

Furthermore, in this specification, the method further comprises checking the status of the terminal based on the status information.

Furthermore, in this specification, the method further comprises updating terminal status information indicating the status of the terminal from off to on when the response message indicates activation of the transmission/reception function.

Furthermore, in this specification, the indication message is transmitted through an Xw-C interface representing an interface for transmitting and receiving control data.

Furthermore, in this specification, the indication message includes at least of basic service set identifier (BSSID) for identifying the AP and a terminal identifier for identifying the terminal.

Furthermore, in this specification, the indication message is a nested structure of a flat structure.

Furthermore, in this specification, the indication message includes a specific bit indicating whether there is an additional packet including at least one terminal ID.

Furthermore, in this specification, the method further comprises transmitting a specific packet for activating a wireless LAN module included in the AP to the AP, when the wireless LAN module is inactive; and receiving a response message indicating whether to activate the wireless LAN module in response to the specific packet from the AP.

Furthermore, in this specification, A terminal for transmitting and receiving data using an LTE-WLAN aggregation in a wireless communication system, the terminal comprising: a radio frequency (RF) module for transmitting and receiving a radio signal with an external device, wherein the RF module includes a Long Term Evolution module and a wireless LAN module; and a processor functionally connected to the RF module, wherein the processor is configured to: transmit status information to an access point (AP), wherein the status information indicates that a wireless LAN module of the terminal is changed over to a OFF state after the terminal transmits the status information, receive a specific packet for indicating an activation of the wireless LAN module from the base station, activate the wireless LAN module based on the instruction message, transmit a response message indicating that the wireless LAN module is activated in response to the specific packet to the AP, and receives the downlink data through an unlicensed spectrum using the LTE-WLAN aggregation from AP.

Advantageous Effects

The present invention has an advantage in that it can increase the amount of network data by sending or receiving data using a licensed band and an unlicensed band through an LTE-WLAN aggregation.

Furthermore, the present invention has an advantage in that it can reduce the power consumption of a UE by activating a Wi-Fi module only when data is generated in order to send/receive data and deactivating the Wi-Fi module if the transmission/reception of data is not present.

Furthermore, the present invention has an advantage in that it can send/receive data depending on the state of a UE in such manner that an AP managing the UE wakes up the Wi-Fi module of the UE by reporting the state of the UE to an eNB if the Wi-Fi module of the UE has been deactivated.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 is a block diagram showing an example of wireless protocol architecture to which a technical characteristic of the present invention may be applied.

FIG. 4 is a diagram showing an example of the network configuration of an LTE WLAN aggregation (LWA) to which an embodiment of the present invention may be applied.

FIG. 5 is a diagram showing an example of the wireless protocol architecture of an LTE WLAN aggregation (LWA) to which an embodiment of the present invention may be applied.

FIG. 6 is a diagram showing an example of the connectivity of an eNB and a WT for an LTE WLAN aggregation (LWA) to which an embodiment of the present invention may be applied.

FIG. 7 is a schematic diagram showing an example of a wake-up operation proposed by an embodiment of the present invention.

FIG. 8 is a flowchart showing an example of a wake-up operation proposed by the present invention.

FIGS. 9 and 10 are diagrams showing examples of the packet structure of a message proposed by the present invention.

FIG. 11 is a flowchart showing another example of a wake-up operation proposed by the present invention.

FIG. 12 is a flowchart showing another example of a wake-up operation proposed by the present invention.

FIG. 13 is a flowchart showing an example of a method for reporting the state of a UE and/or an AP to an eNB, which is proposed by the present invention.

FIG. 14 is a flowchart showing an example of a wake-up operation proposed by the present invention.

FIG. 15 is a flowchart showing an example of an operation of an eNB for activating the WLAN module of a terminal, which is proposed by an embodiment of the present invention.

FIG. 16 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A Pro is an evolution of 3GPP LTE-A. 5G NR is a revolution of 3GPP LTE-A that will be implemented by OFDMA or its variants.

For the purpose of the present invention, the following abbreviations apply

ABS Almost Blank Subframe
AC Access Category
ACK Acknowledgement
ACLR Adjacent Channel Leakage Ratio
AM Acknowledged Mode
AMBR Aggregate Maximum Bit Rate
ANDSF Access Network Discovery and Selection Function
ANR Automatic Neighbour Relation
ARQ Automatic Repeat Request
ARP Allocation and Retention Priority
AS Access Stratum
BCCH Broadcast Control Channel
BCH Broadcast Channel
BL Bandwidth reduced Low complexity
BR-BCCH Bandwidth Reduced Broadcast Control Channel
BSR Buffer Status Report
C/I Carrier-to-Interference Power Ratio
CAZAC Constant Amplitude Zero Auto-Correlation
CA Carrier Aggregation
CBC Cell Broadcast Center
CC Component Carrier
CG Cell Group
CIF Carrier Indicator Field
CIoT Cellular Internet of Things
CMAS Commercial Mobile Alert Service
CMC Connection Mobility Control
CP Cyclic Prefix
CoMP Coordinated Multi Point
C-plane Control Plane
C-RNTI Cell RNTI
CQI Channel Quality Indicator
CRC Cyclic Redundancy Check
CRE Cell Range Extension
CRS Cell-specific Reference Signal
CSA Common Subframe Allocation
CSG Closed Subscriber Group
CSI Channel State Information
CSI-IM CSI interference measurement
CSI-RS CSI reference signal
DC Dual Connectivity
DCCH Dedicated Control Channel
DCN Dedicated Core Network
DeNB Donor eNB
DFTS DFT Spread OFDM
DL Downlink
DMTC Discovery Signal Measurement Timing Configuration
DRB Data Radio Bearer
DRS Discovery Reference Signal
DRX Discontinuous Reception
DTCH Dedicated Traffic Channel
DTX Discontinuous Transmission
DwPTS Downlink Pilot Time Slot
EAB Extended Access Barring
ECGI E-UTRAN Cell Global Identifier
ECM EPS Connection Management
EMM EPS Mobility Management
E-CID Enhanced Cell-ID (positioning method)
eIMTA Enhanced Interference Management and Traffic Adaptation
eHRPD enhanced High Rate Packet Data
eNB E-UTRAN NodeB
EP Elementary Procedure
EPC Evolved Packet Core
EPDCCH Enhanced Physical Downlink Control Channel
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDDM Frequency Division Multiplexing
GERAN GSM EDGE Radio Access Network
GNSS Global Navigation Satellite System
GSM Global System for Mobile communication
GBR Guaranteed Bit Rate
GP Guard Period
GRE Generic Routing Encapsulation
G-RNTI Group RNTI
SC-N-RNTI Single Cell Notification RNTI
SC-RNTI Single Cell RNTI
GUMMEI Globally Unique MME Identifier
GUTI Globally Unique Temporary Identifier
GWCN GateWay Core Network
HARQ Hybrid ARQ
(H)eNB eNB or HeNB
HO Handover
HPLMN Home Public Land Mobile Network
HRPD High Rate Packet Data
HSDPA High Speed Downlink Packet Access
H-SFN Hyper System Frame Number
ICIC Inter-Cell Interference Coordination
IDC In-Device Coexistence
IE Information Element
IKE Internet Key Exchange
IP Internet Protocol
ISM Industrial, Scientific and Medical
KPAS Korean Public Alert System
LAA Licensed-Assisted Access LB Load Balancing
LBT Listen Before Talk
LCG Logical Channel Group
LCR Low Chip Rate
LCS LoCation Service
LIPA Local IP Access
LHN Local Home Network
LHN ID Local Home Network ID
LMU Location Measurement Unit
LPPa LTE Positioning Protocol Annex
L-GW Local Gateway
LTE Long Term Evolution
LWA LTE-WLAN Aggregation
LWAAP LTE-WLAN Aggregation Adaptation Protocol
LWIP LTE WLAN Radio Level Integration with IPsec Tunnel
LWIP-SeGW LWIP Security Gateway
MAC Medium Access Control
MBMS Multimedia Broadcast Multicast Service
MBR Maximum Bit Rate
MBSFN Multimedia Broadcast multicast service Single Frequency Network
MCCH Multicast Control Channel
MCE Multi-cell/multicast Coordination Entity
MCG Master Cell Group
MCH Multicast Channel
MCS Modulation and Coding Scheme
MDT Minimization of Drive Tests
MeNB Master eNB
MGW Media Gateway
MIB Master Information Block
MIMO Multiple Input Multiple Output
MME Mobility Management Entity
MMTEL Multimedia telephony
MPDCCH MTC Physical Downlink Control Channel
MSA MCH Subframe Allocation
MSI MCH Scheduling Information
MSP MCH Scheduling Period
MTC Machine-Type Communications
MTCH Multicast Traffic Channel
NACK Negative Acknowledgement
NAS Non-Access Stratum
NB-IoT Narrow Band Internet of Things
NPBCH Narrowband Physical Broadcast channel
NCC Next Hop Chaining Counter
NH Next Hop key
NNSF NAS Node Selection Function
NPDCCH Narrowband Physical Downlink Control channel
NPDSCH Narrowband Physical Downlink Shared channel
NPRACH Narrowband Physical Random Access channel
NPUSCH Narrowband Physical Uplink Shared channel
NPRS Narrowband Positioning Reference Signal
NPSS Narrowband Primary Synchronization Signal
NR Neighbour cell Relation
NRT Neighbour Relation Table
NSSS Narrowband Secondary Synchronization Signal
OFDM Orthogonal Frequency Division Multiplexing
OFDMA Orthogonal Frequency Division Multiple Access
OPI Offload Preference Indicator
OTDOA Observed Time Difference Of Arrival (positioning method)
P-GW PDN Gateway
P-RNTI Paging RNTI
PA Power Amplifier
PAPR Peak-to-Average Power Ratio
PBCH Physical Broadcast CHannel
PBR Prioritised Bit Rate
PCC Primary Component Carrier
PCCH Paging Control Channel
PCell Primary Cell
PCFICH Physical Control Format Indicator CHannel
PCH Paging Channel
PCI Physical Cell Identifier
PDCCH Physical Downlink Control CHannel
PDCP Packet Data Convergence Protocol
PDN Packet Data Network
PDSCH Physical Downlink Shared CHannel
PDU Protocol Data Unit
PHICH Physical Hybrid ARQ Indicator CHannel
PHY Physical layer
PLMN Public Land Mobile Network
PMCH Physical Multicast CHannel
PMK Pairwise Master Key
PPPP ProSe Per-Packet Priority
PRACH Physical Random Access CHannel
PRB Physical Resource Block
ProSe Proximity based Services
PSBCH Physical Sidelink Broadcast CHannel
PSC Packet Scheduling
PSCCH Physical Sidelink Control CHannel
PSCell Primary SCell
PSDCH Physical Sidelink Discovery CHannel
PSK Pre-Shared Key
PSM Power Saving Mode
PSSCH Physical Sidelink Shared CHannel
pTAG Primary Timing Advance Group
PTW Paging Time Window
PUCCH Physical Uplink Control CHannel
PUSCH Physical Uplink Shared CHannel
PWS Public Warning System
QAM Quadrature Amplitude Modulation
QCI QoS Class Identifier
QoS Quality of Service
R-PDCCH Relay Physical Downlink Control CHannel
RA-RNTI Random Access RNTI
RAC Radio Admission Control
RACH Random Access Channel
RAT Radio Access Technology
RB Radio Bearer
RBC Radio Bearer Control
RCLWI RAN Controlled LTE-WLAN Interworking
RF Radio Frequency
RIBS Radio-interface based synchronization
RIM RAN Information Management
RLC Radio Link Control
RN Relay Node
RNC Radio Network Controller
RNL Radio Network Layer
RNTI Radio Network Temporary Identifier
RMTC RSSI Measurement Timing Configuration
ROHC Robust Header Compression
RRC Radio Resource Control
RRM Radio Resource Management
RU Resource Unit
S-GW Serving Gateway
S-RSRP Sidelink Reference Signal Received Power
S1-MME S1 for the control plane
SCC Secondary Component Carrier
SCell Secondary Cell
SCG Secondary Cell Group
SD-RSRP Sidelink Discovery Reference Signal Received Power SeNB Secondary eNB
SI System Information
SIB System Information Block
SIPTO Selected IP Traffic Offload
SIPTO@LN Selected IP Traffic Offload at the Local Network
SI-RNTI System Information RNTI
S1-U S1 for the user plane
SAE System Architecture Evolution
SAP Service Access Point
SC-FDMA Single Carrier-Frequency Division Multiple Access
SCH Synchronization Channel
SC-MCCH Single Cell Multicast Control Channel
SC-MTCH Single Cell Multicast Transport Channel
SC-PTM Single Cell Point To Multipoint
SCTP Stream Control Transmission Protocol
SDF Service Data Flow
SDMA Spatial Division Multiple Access
SDU Service Data Unit
SeGW Security Gateway
SFN System Frame Number
S-GW Serving GateWay
SBCCH Sidelink Broadcast Control Channel
SL-BCH Sidelink Broadcast Channel
SL-DCH Sidelink Discovery Channel
SL-RNTI Sidelink RNTI
SL-SCH Sidelink Shared Channel
SN Sequence Number
STCH Sidelink Traffic Channel
SPID Subscriber Profile ID for RAT/Frequency Priority
SR Scheduling Request
SRB Signalling Radio Bearer
SU Scheduling Unit
sTAG Secondary Timing Advance Group
TA Tracking Area
TAC Tracking Area Code
TAG Timing Advance Group
TB Transport Block
TCP Transmission Control Protocol
TDD Time Division Duplex
TDM Time Division Multiplexing
TEID Tunnel Endpoint Identifier
TFT Traffic Flow Template
TM Transparent Mode
TMGI Temporary Mobile Group Identity
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
UpPTS Uplink Pilot Time Slot
V2I Vehicle-to-Infrastructure
V2N Vehicle-to-Network
V2P Vehicle-to-Pedestrian
V2V Vehicle-to-Vehicle
V2X Vehicle-to-Everything
VRB Virtual Resource Block
WLAN Wireless Local Area Network
WT WLAN Termination
X2 GW X2 GateWay
X2-C X2-Control plane
X2-U X2-User plane
Xw-C Xw-Control plane
Xw-U Xw-User plane
Xw UP Xw User Plane
AC Access Category
DL Downlink
eNB E-UTRAN NodeB
EP Elementary Procedure
EPC Evolved Packet Core
E-RAB E-UTRAN Radio Access Bearer
E-UTRAN Evolved UTRAN
IE Information Element
IKE Internet Key Exchange
LWA LTE/WLAN Aggregation
LWIP LTE/WLAN Radio Level Integration with IPsec Tunnel
LWIP-SeGW LWIP Security GateWay
PDCP Packet Data Convergence Protocol
RCLWI RAN Controlled LTE-WLAN Interworking
SN Sequence Number
TAC Tracking Area Code
UE User Equipment
UL Uplink
WT WLAN Termination
Xw UP Xw User Plane For the purposes of the present invention, the following terms and definitions apply.

Access Control: the process that checks whether a UE is allowed to access and to be granted services in a closed cell.

Anchor carrier: in NB-IoT, a carrier where the UE assumes that NPSS/NSSS/NPBCH/SIB-NB are transmitted.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

Control plane CIoT EPS optimization: Enables support of efficient transport of user data (IP, non-IP or SMS) over control plane via the MME without triggering data radio bearer establishment, as defined in TS 24.301. In the context of this specification, a NB-IoT UE that only supports Control plane CIoT EPS optimization is a UE that does not support User plane CIoT EPS optimization and S1-U data transfer but may support other CIoT EPS optimizations.

CSG Cell: a cell broadcasting a CSG indicator set to true and a specific CSG identity.

CSG ID Validation: the process that checks whether the CSG ID received via handover messages is the same as the one broadcast by the target E-UTRAN.

CSG member cell: a cell broadcasting the identity of the selected PLMN, registered PLMN or equivalent PLMN and for which the CSG whitelist of the UE includes an entry comprising cell's CSG ID and the respective PLMN identity.

DCN-ID: DCN identity identifies a specific dedicated core network (DCN).

Dual Connectivity: mode of operation of a UE in RRC_CONNECTED, configured with a Master Cell Group and a Secondary Cell Group.

Elementary Procedure: XwAP protocol consists of Elementary Procedures (EPs). An XwAP Elementary Procedure is a unit of interaction between an eNB and WT. An EP consists of an initiating message and possibly a response message. Two kinds of EPs are used:

Class 1: Elementary Procedures with response (success or failure),

Class 2: Elementary Procedures without response.

E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum.

Frequency layer: set of cells with the same carrier frequency.

FeMBMS: further enhanced multimedia broadcast multicast service.

Handover: procedure that changes the serving cell of a UE in RRC_CONNECTED.

Hybrid cell: a cell broadcasting a CSG indicator set to false and a specific CSG identity. This cell is accessible as a CSG cell by UEs which are members of the CSG and as a normal cell by all other UEs.

Local Home Network: as defined in TS 23.401.

LTE bearer: in LTE-WLAN Aggregation, a bearer whose radio protocols are located in the eNB only to use eNB radio resources only.

LWA bearer: in LTE-WLAN Aggregation, a bearer whose radio protocols are located in both the eNB and the WLAN to use both eNB and WLAN resources.

LWAAP PDU: in LTE-WLAN Aggregation, a PDU with DRB ID generated by LWAAP entity for transmission over WLAN.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MBMS-dedicated cell: cell dedicated to MBMS transmission. MBMS-dedicated cell is not supported in this release.

MBMS/Unicast-mixed cell: cell supporting both unicast and MBMS transmissions.

FeMBMS/Unicast-mixed cell: cell supporting MBMS transmission and unicast transmission as SCell.

MCG bearer: in dual connectivity, a bearer whose radio protocols are only located in the MeNB to use MeNB resources only.

Membership Verification: the process that checks whether a UE is a member or non-member of a hybrid cell.

NB-IoT: NB-IoT allows access to network services via E-UTRA with a channel bandwidth limited to 180 kHz.

NB-IoT UE: a UE that uses NB-IoT.

Non-anchor carrier: in NB-IoT, a carrier where the UE does not assume that NPSS/NSSS/NPBCH/SIB-NB are transmitted.

PLMN ID Check: the process that checks whether a PLMN ID is the RPLMN identity or an EPLMN identity of the UE.

Power saving mode: mode configured and controlled by NAS that allows the UE to reduce its power consumption, as defined in TS 24.301, TS 23.401, TS 23.682.

Primary PUCCH group: a group of serving cells including PCell whose PUCCH signalling is associated with the PUCCH on PCell.

Primary Timing Advance Group: Timing Advance Group containing the PCell. In this specification, Primary Timing Advance Group refers also to Timing Advance Group containing the PSCell unless explicitly stated otherwise.

ProSe-enabled Public Safety UE: a UE that the HPLMN has configured to be authorized for Public Safety use, and which is ProSe-enabled and supports ProSe procedures and capabilities specific to Public Safety. The UE may, but need not, have a USIM with one of the special access classes {12, 13, 14}.

ProSe Per-Packet Priority: a scalar value associated with a protocol data unit that defines the priority handling to be applied for transmission of that protocol data unit.

ProSe UE-to-Network Relay: a UE that provides functionality to support connectivity to the network for Remote UE(s).

ProSe UE-to-Network Relay Selection: Process of identifying a potential ProSe UE-to Network Relay, which can be used for connectivity services (e.g. to communicate with a PDN).

ProSe UE-to-Network Relay Reselection: process of changing previously selected ProSe UE-to-Network Relay and identifying potential a new ProSe UE-to-Network Relay, which can be be used for connectivity services (e.g. to communicate with PDN).

Public Safety ProSe Carrier: carrier frequency for public safety sidelink communication and public safety sidelink discovery.

PUCCH group: either primary PUCCH group or a secondary PUCCH group.

PUCCH SCell: a Secondary Cell configured with PUCCH.

RACH-less HO/SeNB change: skipping random access procedure during handover or change of SeNB.

Remote UE: a ProSe-enabled Public Safety UE, that communicates with a PDN via a ProSe UE-to-Network Relay.

SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Secondary PUCCH group: a group of SCells whose PUCCH signalling is associated with the PUCCH on the PUCCH SCell.

Secondary Timing Advance Group: Timing Advance Group containing neither the PCell nor PSCell.

Sidelink: UE to UE interface for sidelink communication, V2X sidelink communication and sidelink discovery. The Sidelink corresponds to the PC5 interface as defined in TS 23.303.

Sidelink Control period: period over which resources are allocated in a cell for sidelink control information and sidelink data transmissions. The Sidelink Control period corresponds to the PSCCH period as defined in TS 36.213.

Sidelink communication: AS functionality enabling ProSe Direct Communication as defined in TS 23.303, between two or more nearby UEs, using E-UTRA technology but not traversing any network node. In this version, the terminology "sidelink communication" without "V2X" prefix only concerns PS unless specifically stated otherwise.

Sidelink discovery: AS functionality enabling ProSe Direct Discovery as defined in TS 23.303, using E-UTRA technology but not traversing any network node.

Split bearer: in dual connectivity, a bearer whose radio protocols are located in both the MeNB and the SeNB to use both MeNB and SeNB resources.

Split LWA bearer: in LTE-WLAN Aggregation, a bearer whose radio protocols are located in both the eNB and the WLAN to use both eNB and WLAN radio resources.

Switched LWA bearer: in LTE-WLAN Aggregation, a bearer whose radio protocols are located in both the eNB and the WLAN but uses WLAN radio resources only.

Timing Advance Group: a group of serving cells that is configured by RRC and that, for the cells with an UL configured, use the same timing reference cell and the same Timing Advance value.

User plane CIoT EPS optimization: Enables support for change from EMM-IDLE mode to EMM-CONNECTED mode without the need for using the Service Request procedure, as defined in TS 24.301.

V2X sidelink communication: AS functionality enabling V2X Communication as defined in TS 23.285, between nearby UEs, using E-UTRA technology but not traversing any network node.

WLAN Termination: the logical node that terminates the Xw interface on the WLAN side.

FIG. 1 is a view illustrating an Evolved Packet System which is associated with the Long Term Evolution (LTE) system to which the present invention may be applied.

The LTE system aims to provide seamless Internet Protocol (IP) connectivity between UE 10 and a pack data network (PDN), without any disruption to an end user's application during mobility. While the LTE system encompasses the evolution of the radio access through an Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Hereinafter, Terminology used in this specification is defined as follows.

CMAS: Commercial Mobile Alert System
ETWS: Earthquake Tsunami Warning System
PWS: Public Warning System
WEA: Wireless Emergency Alert
PSAP: Public Safety Answering Point
Commercial Mobile Alert System: Public Warning System that delivers Warning Notifications provided by Warning Notification Providers to CMAS capable PWS-UEs. CMAS defines three different classes of Warning Notifications (Presidential, Imminent Threat and Child Abduction Emergency)
Earthquake and Tsunami Warning System: Public Warning System that delivers Warning Notifications specific to Earthquake and Tsunami provided by Warning Notification Providers to the UEs which have the capability of receiving Primary and Secondary Warning Notifications within Notification Areas through the 3GPP network
Notification Area: area where Warning Notifications are broadcast. This is an area that closely approximates the geographical information provided by the Warning Notification Provider
PWS-UE: User Equipment (UE) which has the capability of receiving Warning Notifications within Notification Areas through the 3GPP network and conforms to the behaviour specific to the PWS service such as dedicated alerting indication and display of the Warning Notification upon reception.

FIG. 3 is a block diagram showing an example of wireless protocol architecture to which a technical characteristic of the present invention may be applied.

FIG. 3(a) shows an example of wireless protocol architecture for a user plane, and FIG. 3(b) is a block diagram showing an example of wireless protocol architecture for a control plane.

The user plane is a protocol stack for user data transmission, and the control plane is a protocol stack for control signal transmission.

Referring to FIGS. 3(a) and 3(b), a physical (PHY) layer provides an information transfer service to a higher layer using a physical channel. The PHY layer is connected to a medium access control (MAC) layer, that is, a higher layer, through a transport channel Data can be transferred between the MAC layer and the PHY layer through the transport channel. The transport channel is divided depending on how data is transferred based on what characteristic through a radio interface.

Data is moved through a physical channel between different PHY layers, that is, between the PHY layers of a transmitter and a receiver. The physical channel may be modulated according to an orthogonal frequency division multiplexing (OFDM) scheme and uses time and a frequency as radio resources.

The function of the MAC layer includes mapping between a logical channel and the transport channel and multiplexing/demultiplexing (the meaning of "/" includes both the concepts of "or" and "and") as a transport block provided to the physical channel on the transport channel of a MAC service data unit (SDU) belongs to the logical channel. The MAC layer provides services to a radio link control (RLC) layer through the logical channel.

The function of the RLC layer includes the connection, segmentation and reassembly of an RLC SDU. In order to guarantee various quality of services (QoS) required by a radio bearer (RB), the RLC layer provides three operation modes: a transparent mode (TM), an unacknowledged mode (UM) and an acknowledged mode (AM). The AM RLC provides error correction through an automatic repeat request (ARQ).

A radio resource control (RRC) layer is defined only in the control plane. The RRC layer is related to the configuration, re-configuration and release of radio bears and responsible for control of the logical channel, transport channel and physical channel. An RB means a logical path provided by the first layer (PHY layer) and the second layer (the MAC layer, RLC layer or PDCP layer) in order to transfer data between a UE and a network.

The function of a packet data convergence protocol (PDCP) layer in the user plane includes the transfer, header compression and ciphering of user data. The function of the PDCP in the control plane includes the transfer and encryption/integrity protection of control plane data.

What an RB is configured means a process of defining the characteristics of a wireless protocol layer and channels in order to provide a specific service and of configuring each detailed parameter and operating method. An RB may be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of a UE and the RRC layer of an E-UTRAN, the UE is in the RRC connected state. If not, the UE is in an RRC idle state.

A downlink transport channel through which data is transmitted from a network to a UE includes a broadcast channel (BCH) through which system information is transmitted and a downlink shared channel (SCH) through which user traffic or a control message is transmitted. Traffic or a control message for downlink multicast or broadcast service may be transmitted through a downlink SCH, or may be transmitted through an additional downlink multicast channel (MCH). Meanwhile, an uplink transport channel through which data is transmitted from a UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

FIG. 4 is a diagram showing an example of the network configuration of an LTE WLAN aggregation (LWA) to which an embodiment of the present invention may be applied.

A tremendous increase of mobile data traffics has been witnessed due to proliferation of advanced wireless networks, e.g., long-term evolution (LTE) and long-term evolution advanced (LTE-Advanced) networks and smart devices, e.g., smart phones, and tablets.

New services and applications will be kept being introduced based on those successful technological achievements, thus there is no doubt that the trend in mobile traffic increase will require major breakthroughs in near future. Even though advances in cellular technology, e.g., LTE, LTE-Advanced, etc., have enhanced the performance and capacity of mobile networks, it will not be sufficient to meet the mobile data demand with exponential growth rate.

The usage of unlicensed spectrum provides an attractive opportunity for operators to help support their subscribers by increasing network data capacity.

Recent research and development (R&D) and standardization efforts have been focused to aggregate heterogeneous LTE and LTE-Advanced networks, and wireless local area network (WLAN) so as to provide increased throughput using unlicensed spectrum and relieve congestion by off-loading of cellular data through WLAN.

Two interworking features are defined in 3GPP: LTE WLAN Aggregation (LWA) and LTE WLAN Radio Level Integration with IPsec Tunnel (LWIP).

In LWA, data aggregation is performed at the radio access network where eNB schedules packets to be transmitted on LTE and WLAN radio links. The advantage of data aggregation at the radio access network (RAN) is that no changes in core network are needed. Main difference between LWA and LWIP lies in who has the control of WLAN.

In LWA, cellular operators have control on WLAN, while customers other than operators have the control of WLAN in LWIP.

E-UTRAN supports LTE-WLAN aggregation (LWA) operation whereby a UE in RRC_CONNECTED is configured by the eNB to utilize radio resources of LTE and WLAN. Two scenarios are supported depending on the backhaul connection between LTE and WLAN:
non-collocated LWA scenario for a non-ideal backhaul;
collocated LWA scenario for an ideal/internal backhaul;

As shown in FIG. 4, the LWA network includes a WLAN termination (WT) unlike LTE or LTE-A. An eNB and a WT are connected through an Xw interface, that is, a new interface, for control information and data transmission/reception. A WLAN Termination (WT) terminates the Xw interface for a WLAN.

In this case, the WT may be defined as follows.

WT: handles multiple APs, forward data to which AP; WT also notifies eNB that a served terminal has WUR. eNB asks WT to wake up the terminal through a related AP.

In an embodiment of the present invention, a WT may be included in an eNB or an AP. That is, the function of the WT may be performed by the eNB or the AP.

FIG. 5 is a diagram showing an example of the wireless protocol architecture of an LTE WLAN aggregation (LWA) to which an embodiment of the present invention may be applied.

In LWA, the radio protocol architecture that a particular bearer uses depends on the LWA backhaul scenario and how the bearer is set up. Two bearer types exist for LWA: split LWA bearer and switched LWA bearer.

The split LWA bearer may transfer LTE data and Wi-Fi data to an RLC layer or an LWAAP layer. That is, the split LWA bearer transfers received LTE data to the RLC layer when the LTE data is received from a higher layer and transfers received Wi-Fi data to the LWAAP layer when the Wi-Fi data is received from a higher layer.

FIG. 5($a$) shows an example of LWA wireless protocol architecture for a collocated scenario, and FIG. 5($b$) shows an example of LWA wireless protocol architecture for a non-collocated scenario.

For PDUs sent over WLAN in LWA operation, the LTE-WLAN Aggregation Adaptation Protocol (LWAAP) entity generates LWAAP PDU containing a dedicated radio bearer (DRB) identity and the WT uses the LWA EtherType 0x9E65 for forwarding the data to the UE over WLAN. The UE uses the LWA EtherType to determine that the received PDU belongs to an LWA bearer and uses the DRB identity to determine to which LWA bearer the PDU belongs to.

In the downlink, the PDCP sublayer of the UE supports in-sequence delivery of upper layer PDUs based on the reordering procedure introduced for DC. In the uplink, PDCP PDUs can only be sent via the LTE.

The UE supporting LWA may be configured by the eNB to send PDCP status report or LWA status report, in cases where feedback from WT is not available.

Only RLC AM can be configured for an LWA bearer.

E-UTRAN does not configure LWA with DC, LWIP or RAN Controlled LTE-WLAN Interworking (RCLWI) simultaneously for the same UE.

If LWA- and RAN-assisted WLAN interworkings are simultaneously configured for the same UE, in RRC Connected, the UE only applies LWA.

For LWA bearer UL configuration, if the data available for transmission is equal to or exceeds the threshold indicated by E-UTRAN the UE decides which PDCP PDUs are sent over WLAN or LTE. If the data available is below the threshold, the UE transmits PDCP PDUs on LTE or WLAN as configured by E-UTRAN.

For each LWA DRB, E-UTRAN may configure the IEEE 802.11 AC value to be used for the PDCP PDUs that are sent over WLAN in the uplink.

For LWA bearer, for routing of UL data over WLAN the WT MAC address may be provided to the UE by the E-UTRAN or using other WLAN procedure.

FIG. 6 is a diagram showing an example of the connectivity of an eNB and a WT for an LTE WLAN aggregation (LWA) to which an embodiment of the present invention may be applied.

FIG. 6(a) shows an example of a network interface in a user plane, and FIG. 6(b) shows an example of a network interface in a control plane.

In the non-collocated LWA scenario, the eNB is connected to one or more WTs via an Xw interface. In the collocated LWA scenario the interface between LTE and WLAN is up to implementation. For LWA, the only required interfaces to the Core Network are S1-U and S1-MME which are terminated at the eNB. No Core Network interface is required for the WLAN.

User Plane

In the non-collocated LWA scenario, the Xw user plane interface (Xw-U) is defined between eNB and WT. The Xw-U interface supports flow control based on feedback from WT.

The Flow Control function is applied in the downlink when an E-RAB is mapped onto an LWA bearer, i.e. the flow control information is provided by the WT to the eNB for the eNB to control the downlink user data flow to the WT for the LWA bearer. The OAM configures the eNB with the information of whether the Xw DL delivery status provided from a connected WT concerns LWAAP PDUs successfully delivered to the UE or successfully transferred toward the UE.

The Xw-U interface is used to deliver LWAAP PDUs between eNB and WT.

For LWA, the S1-U terminates in the eNB and, if Xw-U user data bearers are associated with E-RABs for which the LWA bearer option is configured, the user plane data is transferred from eNB to WT using the Xw-U interface.

FIG. 6(a) shows U-plane connectivity of eNB and WT involved in LWA for a certain UE: the S1-U is terminated at the eNB; the eNB and the WT are interconnected via Xw-U.

Control Plane

In the non-collocated LWA scenario, the Xw control plane interface (Xw-C) is defined between eNB and WT. The application layer signaling protocol is referred to as Xw-AP (Xw Application Protocol).

The Xw-AP protocol supports the following functions:
Transfer of WLAN metrics (e.g., BSS load) from WT to eNB;
Support of LWA for UE in ECM-CONNECTED:
Establishment, Modification and Release of a UE context at the WT;
Control of user plane tunnels between eNB and WT for a specific UE for LWA bearers.
General Xw management and error handling functions:
Error indication;
Setting up the Xw;
Resetting the Xw;
Updating the WT configuration data.

eNB-WT control plane signaling for LWA is performed by means of Xw-C interface signaling.

There is only one S1-MME connection per LWA UE between the eNB and the MME. Respective coordination between eNB and WT is performed by means of Xw interface signaling.

FIG. 6(b) shows C-plane connectivity of eNB and WT involved in LWA for a certain UE: the S1-MME is terminated in eNB; the eNB and the WT are interconnected via Xw-C.

FIG. 7 is a schematic diagram showing an example of a wake-up operation proposed by an embodiment of the present invention.

Referring to FIG. 7, if data is to be transmitted/received using an LWA, only a Wi-Fi module may be activated only when data is generated and the data may be transmitted/received.

Specifically, if data is to be transmitted/received through Wi-Fi, although there is no data transmission/reception, power consumption of a UE is increased if a Wi-Fi module is always activated (or ON).

Accordingly, in order to reduce power consumption of the UE, there is a need for a method for activating the Wi-Fi module only if data transmission/reception is present and deactivating the Wi-Fi module while there is no data transmission.

Such a method is hereinafter called a wake-up radio (WUR).

In order to apply the WUR method, a UE may include a separate low power module (hereinafter referred to as a "WUR module") for receiving a packet (hereinafter referred to as a "Wake-Up Packet") for activating a WLAN module when the WLAN module is a deactivation state in addition to a WLAN module (or Wi-Fi Module).

The low power module for receiving a Wake-Up Packet may operate in low power (e.g., 100 uw), and may receive a Wake-Up Packet from another device and activate a WLAN module.

A WUR technology is one of the green technologies since it can prevent the waste of power when it is not necessarily required. FIG. 7 shows the overall description of a WUR operation.

(a) WLAN module (or Wi-Fi Module) will totally be turned off when no data is transmitted and received (this status is called "OFF" in which WLAN module (or Wi-Fi Module) is off but WUR module is on).

If there is the data for UE with specific WLAN module identity, for example medium-access control identification (MACID), association identification (AID), then access point (AP) sends "wake-up" signal (or packet) to it before actual data is delivered.

Wake-up module in UE keeps looking for the presence of wake-up signal coming and, if it is detected, then WLAN module will be wake up.

The length of WLAN module "OFF" period in WUR will be much longer than that of sleep-mode currently defined and thus much power can be saved.

Current specifications on LWA and LWIP do not support WUR WLAN functionality. In this invention, we propose the method to support UE with WUR capability in the context of LWA and LWIP.

Existing messages and protocols may be used to support UE with WUR capability. However, it can incur additional complexity in the sense that:
Control over the transmission through WLAN is given to AP operating in unlicensed band.
It will require increased buffer capability in AP.

Re-ordering complexity in UE will become worse because the transmission from eNB and AP is not coordinated properly.

This invention will address those problems and/or shortcomings aforementioned by introducing new elemental procedures and messages between eNB and WT.

Also, to support WLAN devices with WUR capability in the context of LWA and LWIP, new signaling is required to deliver the status of WLAN modules in user equipment (UE) to eNB and wake-up signal to WLAN module before the data transmission from eNB.

In this invention, we propose method to support LWA and LWIP when WLAN module in UE has wake-up radio (WUR) capability.

FIG. 8 is a flowchart showing an example of a wake-up operation proposed by the present invention.

Referring to FIG. 8, when the WLAN module of a UE is in a deactivation state, an eNB may activate the WLAN module of the UE and send data to the UE.

First, it is assumed that the eNB, WT, AP and UE (or STA) of FIG. 8 support an LWA and a WUR and the eNB has been associated with a specific UE associated with an AP that belongs to the MNO of the eNB.

Furthermore, it is assumed that the WLAN module of the UE is present in an OFF state.

When data to be transmitted through the LWA or LWIP is generated, the eNB sends the data to the UE over an LTE network if the generated data is LTE data and sends the data to the UE over a Wi-Fi network if the generated data is Wi-Fi data.

However, the UE cannot receive the data although the eNB sends the data to the UE because the WLAN module of the UE is in the OFF state.

Accordingly, the eNB sends an Indication message indicating the activation of the WLAN module of the UE to the WT in order to make the UE an ON state by activating the WLAN module of the UE (S8010).

In this case, the Indication message transmitted from the eNB to the WT may be called a Wake-Up Indication message.

After sending the Wake-Up Indication message, the eNB drives a timer and recognizes that the activation of the WLAN module of the UE has failed if it does not receive a Confirmation (or Indication) message indicating that the WLAN module of the UE has been activated from the WT within a specific time.

The Wake-Up Indication message may include a WT ID for identifying a WT, a BSS ID for identifying a basic service set (BSS), and a UE ID for identifying a UE that will activate a WLAN module.

The BSS means a set of one or more STAs and an AP which form successful synchronization and can communicate with each other.

The BSS ID may be the MAC ID of 48 bits of an AP, and the UE ID may be a MAC ID or AID of a STA.

In this case, the Wake-Up Indication message transmitted by the eNB may have a nested structure or a flat structure.

Furthermore, when the eNB activates a plurality of UEs, the Wake-Up Indication message may include a plurality of BSS IDs and/or UE IDs. In this case, a plurality of packets may be transmitted. The last bit of the packet indicates whether there is a packet to be additionally transmitted.

For example, an additionally transmitted packet is present when the last bit is "1", and an additionally transmitted packet is not present when the last bit is "0."

Accordingly, if its own ID is not included in a transmitted packet, a UE checks whether an additionally transmitted packet is present by checking the last bit.

For example, when a bit of the Wake-Up Indication message is "1", the UE may recognize that an additionally transmitted packet is present, may receive the additionally transmitted packet, and may check whether its own ID is included in the packet.

However, if the bit of the Wake-Up Indication message is "0", the UE may recognize that a subsequently transmitted packet is not present.

The WT that has received the Wake-Up Indication message from the eNB searches for BSS information included in the received Wake-Up Indication message and processes the received message.

That is, the WT identifies a BSS (or AP) including a UE that needs to be activated through a BSS ID included in the Wake-Up Indication message, and deletes a WT ID that is its own ID.

The WT sends a Wake-Up Indication message processed as a BSS (or AP) identified through the BSS ID (S8020).

In this case, the Wake-Up Indication message transmitted by the WT includes a BSS ID and a UE ID because the WT ID has been deleted.

The BSS (or AP) that has received the Wake-Up Indication message from the WT recognizes a UE whose WLAN module is to be activated through the UE ID included in the Wake-Up Indication message, and generates a Wake-Up Packet that will activate the WLAN module.

The Wake-Up Packet includes the UE ID for identifying the UE and may have the same structure as the Wake-Up Indication message.

The BSS (or AP) that has generated the Wake-Up Packet sends the generated Wake-Up Packet to the UE (S8030).

In this case, if a plurality of UE IDs has been included in the Wake-Up Indication message, the BSS (or AP) may generate a Wake-Up Packet including a plurality of UE IDs and send the generated Wake-Up Packet to the plurality of UEs (S8030).

The UE(s) that has received the Wake-Up Packet from the BSS may recognize that data to be received through the WLAN module has been generated, and activate the WLAN module.

In this case, since the WLAN module is the deactivation state, the UE may receive the Wake-Up Packet, transmitted by the BSS (or AP), through a WUR module that consumes low power.

The UE that has activated the WLAN module generates a Wake-Up Response message in order to notify the eNB that the WLAN module has been activated, and sends the generated Wake-Up Response message to the BSS (or AP) (S8040).

If the WLAN module of the UE has not been activated, the UE may send a Reject message indicative of a WLAN module activation failure to the BSS in order to notify the BSS that the WLAN module has not been activated. The Reject message may include a Reason Field indicative of a reason that the WLAN module has not been activated.

The Wake-Up Response message may include the BSS ID for identifying the BSS and the UE ID for identifying the UE that has sent the Wake-Up Response message.

The BSS ID may be the MAC ID of 48 bits of the AP, and the UE ID may be a MAC ID or AID.

The AP that has received the Wake-Up Response message identifies the UE that has sent the Wake-Up Response message using the UE ID included in the Wake-Up Response message, and confirms whether the Wake-Up Response message is a message transmitted thereto using the BSS ID.

Thereafter, the AP includes a WT ID in the received Wake-Up Response message and sends the message to the WT (S8050).

In this case, if Wake-Up Response messages are received from a plurality of UEs, the AP may add its own ID to each of the messages and sends the plurality of messages to the WT or may include a plurality of UE IDs in one message and send the one message to the WT.

If the Wake-Up Response message includes a plurality of UE IDs, it may have the same structure as the Wake-Up Request message.

The WT generates a Confirmation message for notifying the eNB that the WLAN module of the UE has been activated using the WT ID, BSS ID and UE ID included in the received Wake-Up Response message, and sends the generated Confirmation message to the eNB (S8060).

The eNB may recognize the UE whose WLAN module has been activated through the UE ID(s) included in the Confirmation message transmitted by the WT.

Thereafter, the eNB sends LWA data or LWIP data to be transmitted the UE whose WLAN module has been activated to the AP through the LWA or the LWIP (S8070). The AP sends the received LWA data or LWIP data to the UE (S8080).

In this case, the transmission of the LWA or LWIP data may mean that LTE data has been embedded and/or tunneled in Wi-Fi and transmitted.

Furthermore, the LWA data or the LWIP data may be transmitted to the UE through a specific bearer configured to send/receive data using an LTW-WLAN aggregation.

The UE that has received the LWA data or the LWIP data from the BSS sends an Ack message to the AP if the received data is successfully decoded and sends a Nack message to the AP of the decoding fails (S8090).

If the AP receives the Nack message from the UE, the AP may send the same data to the UE again.

If the WT is included in the eNB, that is, if the eNB performs the function of the WT, the steps S8010 and S8060 of FIG. 8 may be omitted.

Through such a method, if there is no data transmission/reception, an WLAN module having great power consumption may be deactivated. A WLAN module may be activated through a WUR module that consumes low power only when data is generated.

Accordingly, an embodiment of the present invention can reduce power consumed because a WLAN module is always activated.

In another embodiment of the present invention, a BSS may obtain (or collect) the state of the WLAN modules of UEs belonging to the BSS and send the state to an eNB through a WT.

That is, the eNB may activate the WLAN modules of the UEs in the deactivation state only when it is aware of whether the state of the WLAN modules of the UEs are activated or deactivated.

Accordingly, if at least one UE belonging to the BSS has its own WLAN module activated (or ON) or deactivated (or OFF), it sends the state of the WLAN module to the BSS and activates or deactivates the WLAN module.

The BSS reports the state of the WLAN module, transmitted by at least one UE, to the eNB through the WT.

Accordingly the eNB may recognize the UE including the WLAN module in the deactivation state, and activate the WLAN module in the deactivation state through the operation of FIG. 8.

In this case, when the AP of the BSS is deactivated, the WT may report the state of APs to the eNB.

FIGS. 9 and 10 are diagrams showing examples of the packet structure of a message proposed by the present invention.

Referring to FIGS. 9 and 10, a packet for a WUR operation in the LWA and/or the LWIP may have a nested structure or a flat structure.

Specifically, FIG. 9 shows an example of the packet format of the Wake-Up Indication message, and FIG. 10 shows an example of the packet format of the Wake-Up Packet.

The Wake-Up Indication message may have the flat structure as shown in FIG. 9(*a*) or the nested structure as shown in FIGS. 9(*b*) and 9(*c*).

If a Wake-Up Indication message has the flat structure as shown in FIG. 9(*a*), it may include a WT ID, BSS ID and UE ID.

If a plurality of UE IDs is transmitted through the Wake-Up Indication message, the Wake-Up Indication message may include an Additional Information Flag indicating whether an additional packet for sending a UE ID is present.

The packet for sending an additional UE ID is not present when the Additional Information Flag is "0" and is present when the Additional Information Flag is "1."

If a Wake-Up Indication message has the nested structure as shown in FIGS. 9(*b*) and 9(*c*), it may include a WT ID and an ID Field 1. The ID Field 1 may include an ID Field 2 including a BSS ID and a UE ID.

If a plurality of UE IDs is transmitted through a plurality of packets, the Wake-Up Indication message may include an Additional Information Flag indicating whether an additional packet for sending a UE ID is present, as shown in FIG. 9(*b*).

In contrast, if a plurality of UE IDs is transmitted through one packet, the ID Field 2 may include a plurality of UE IDs as shown in FIG. 9(*c*).

The Wake-Up Packet may include a legacy format preamble, including a legacy (L) (or non-HT)-short training field (STF), L-long training field (LTF) and L (or Non-HT)-signal (SIG) field, and a Payload field as shown in FIG. 10.

The L-STF, L-LTF and L-SIG field mean legacy fields for backward compatibility. A UE may sense the start of a packet through an L-STF field and may be aware of the end of the packet through an L-SIG field.

The Payload field may include a Wake-Up Preamble, MAC Header, Frame Body and FCS field.

The Wake-Up Preamble field includes a Wake-up Preamble, such as a PN sequence. The MAC Header includes the address of a UE that receives the Wake-Up Packet.

The Frame Body field includes information to be transmitted through the Wake-Up Packet. The FCS field includes CRC.

FIG. 11 is a flowchart showing another example of a wake-up operation proposed by the present invention.

Referring to FIG. 11, if an AP also supports a WUR in addition to a UE, a WT needs to activate the AP before it sends to be transmitted to the UE to the AP.

First, it is assumed that the WT and the AP have been wirelessly connected.

Specifically, when data to be transmitted is generated through an LWA or an LWIP, an eNB sends the data to the UE over an LTE network if the generated data is LTE data, and sends the data to the UE over a WI-FI network if the generated data is Wi-Fi data.

However, if the AP supports a WUR and is a deactivation state, the eNB needs to activate the AP through the procedure of FIG. 8 before it activates the UE.

In order to activate the AP associated with the UE, the eNB sends an Indication message indicative of the activation of the AP to the WT (S11010).

In this case, the Indication message transmitted from the eNB to the WT may be called a Wake-Up Indication message.

After sending the Wake-Up Indication message, the eNB drives a timer. If the eNB does not receive a Confirmation message indicating that the AP has been activated from the WT within a specific time, it recognizes that the activation of the AP has failed.

The Wake-Up Indication message may include a WT ID for identifying the WT and a BSS ID for identifying a basic service set (BSS).

The BSS ID may be the MAC ID of 48 bits of the AP.

In this case, the Wake-Up Indication message transmitted by the eNB may have the nested structure or flat structure described with reference to FIG. 9.

Furthermore, if the eNB activates a plurality of APs, the Wake-Up Indication message may include a plurality of BSS IDs. In this case, a plurality of packets may be transmitted, and the last bit of the packet indicates whether there is a packet to be additionally transmitted.

For example, an additionally transmitted packet is present when the last bit is "1", and an additionally transmitted packet is not present when the last bit is "0."

Accordingly, the AP checks whether an additionally transmitted packet is present by checking the last bit if its own ID is not included in the transmitted packet.

For example, when a bit of the Wake-Up Indication message is "1", the AP may recognize that an additionally transmitted packet is present, may receive the additionally transmitted packet, and may check whether its own ID is included in the packet.

However, when a bit of the Wake-Up Indication message is "0", the AP may recognize that a subsequently transmitted packet is not present.

The WT that has received the Wake-Up Indication message from the eNB recognizes an AP that will be activated through the BSS ID included in the Wake-Up Indication message, and generates a Wake-Up Packet for activating the AP.

The Wake-Up Packet includes a BSS ID for identifying the AP and may have the same structure as the Wake-Up Indication message or may have the structure described with reference to FIG. 10.

The WT that has generated the Wake-Up Packet sends the generated Wake-Up Packet to the BSS (or AP) (S11020).

In this case, if a plurality of BSS IDs is included in the Wake-Up Indication message, the WT may generate a Wake-Up Packet including the plurality of BSSs (or APs) and send the generated Wake-Up Packet to the plurality of BSSs (or APs).

The BSS (or AP) that has received the Wake-Up Packet from the WT may recognize that data to be transmitted to the UE has occurred, and shifts from the deactivation state to an activation state.

In this case, the UE may receive the Wake-Up Packet, transmitted by the WT, through a WUR module that consumes low power because the BSS (or AP) is in the deactivation state.

The BSS (or AP) that has shifted to the activation state generates a Wake-Up Response message in order to notify the eNB that it has shifted to the activation state, and sends the generated Wake-Up Response message to the WT (S11030).

If the AP has not shifted to the activation state, it may send a Reject message indicative of a WLAN module activation failure to the BSS in order to notify the WT that the AP has failed in the shift to the activation state. The Reject message may include a Reason Field indicative of a reason that the WLAN module has not been activated.

The Wake-Up Response message may include a WT ID for identifying the WT and an AP ID for identifying the BSS (or AP) that has sent the Wake-Up Response message.

The BSS ID may be the MAC ID of 48 bits of the AP.

The WT that has received the Wake-Up Response message identifies the BSS that has sent the message using the BSS ID included in the Wake-Up Response message, and checks whether the Wake-Up Response message is a message transmitted thereto using the WT ID.

The WT generates a Confirmation message providing notification that the BSS has been activated using the WT ID and BSS ID included in the received Wake-Up Response message, and sends the generated Confirmation message to the eNB (S11040).

The eNB may recognize the activated AP based on the BSS ID(s) included in the Confirmation message transmitted by the WT.

Thereafter, the eNB may activate the WLAN module of the UE through the method described with reference to FIG. 8 and send/receive data.

FIG. 12 is a flowchart showing another example of a wake-up operation proposed by the present invention.

Referring to FIG. 12, when LWA or the LWIP data to be transmitted to a UE is generated, an eNB may send a message that requests the activation of the LWAN module of the UE to a WT.

First, it is assumed that the eNB and WT of FIG. 12 support an LWA and a WUR and the eNB has been associated with a specific UE associated with an AP that belongs to the MNO of the eNB.

Furthermore, it is assumed that the WLAN module of the UE is in an OFF state.

When data to be transmitted through the LWA or the LWIP is generated, the eNB sends the data to the UE over an LTE network if the generated data is LTE data and sends the data to the UE over a WI-FI network if the generated data is Wi-Fi data.

However, the UE cannot receive the data although the eNB sends the data to the UE because the WLAN module of the UE is the OFF state.

Accordingly, in order to make the WLAN module of the UE an ON state by activating the WLAN module, the eNB sends an Indication message that requests the activation of the WLAN module of the UE to the WT (S12010).

In this case, the Indication message transmitted from the eNB to the WT may be called a Wake-Up request message.

After sending the Wake-Up request message, the eNB drives a timer. If a response indicating that the WLAN module of the UE has been activated is not received from the WT within a specific time, the eNB recognizes that the activation of the WLAN module has failed.

The Wake-Up Request message may include a WT ID for identifying the WT, a BSS ID for identifying a basic service set (BSS), and a UE ID for identifying a UE whose WLAN module is to be activated.

In this case, the Wake-Up request message may have the structure described with reference to FIG. 9.

The WT that has received the Wake-Up Request message may instruct a BSS associated with the UE to activate the UE by performing the procedure described with reference to FIG. 8, and may receive a message indicating whether the WLAN module of the UE has been activated from the BSS.

If the WLAN module of the UE has been activated, the WT sends an Acknowledge message to the eNB in order to notify the eNB that the WLAN module of the UE has been successfully activated (S12020).

The Acknowledge message may be called a WLAN UE Wake-up Request Acknowledge message and may include a WT ID, BSS ID and UE ID.

If the WT is associated with a plurality of eNBs, the WLAN UE Wake-up Request Acknowledge message may further include eNB IDs.

Furthermore, the WLAN UE Wake-up Request Acknowledge message may have the flat structure or nested structure described with reference to FIG. 9.

However, if the WLAN module of the UE has not been activated, the WT sends a Reject message to the eNB in order to notify the eNB that the activation of the WLAN module of the UE has failed (S12020).

The Reject message may be called a WLAN UE Wake-up Request Reject message and may include a WT ID, BSS ID, UE ID and Reason Field.

The Reason Field indicates a reason that the activation of the WLAN module of the UE has failed.

If the WT is associated with a plurality of eNBs, the WLAN UE Wake-Up Request Acknowledge message may further include eNB IDs.

Furthermore, the WLAN UE Wake-up Request Acknowledge message may have the flat structure or nested structure described with reference to FIG. 9.

After sending the Request message at step S12040, if the eNB has not received an Acknowledge message or Reject message within a specific time, the eNB may determine that the activation of the WLAN module has failed.

FIG. 13 is a flowchart showing an example of a method for reporting the state of a UE and/or an AP to an eNB, which is proposed by the present invention.

Referring to FIG. 13, if UEs belonging to a BSS have been deactivated (or OFF), an eNB may obtain the state of the UEs through a WT.

Specifically, if the WLAN module of a UE has been deactivated, the eNB needs to have recognized whether the WLAN module of the UE is an activation state or a deactivation state.

Accordingly, when the WLAN module of at least one UE belonging to the BSS is deactivated, the UE sends status information indicative of the deactivation of the WLAN module to the BSS.

The BSS obtains status information indicative of the state of the WLAN module of at least one UE from the UE and sends an Indication message, including the obtained status information, to the WT.

The WT that has obtained the status information of the WLAN module included in the at least one UE from the BSS sends the received Indication message to the eNB using the aforementioned Xw-AP interface (S13010).

The Indication message transmitted by the WT may include a WT ID, a BSS ID indicative of the BSS to which the UE belongs, and a UE ID (MAC ID and/or AID) in addition to the status information of the at least one UE.

The eNB may recognize whether the WLAN modules of the UEs have been activated or deactivated through the Indication message transmitted by the WT.

That is, the eNB may recognize the UEs whose WLAN modules have been deactivated through the Indication message.

The eNB that has received the Indication message sends a Confirmation message to the WT as a response to the Indication message (13020).

Thereafter, when data to be transmitted to the UE whose WLAN module has been deactivated is generated, the eNB may activate the WLAN module of the UE through the procedure described with reference to FIG. 8, and may send the data.

In this case, the generated data may be transmitted through the aforementioned Xw-AP interface.

If the WLAN module of the UE has been activated through the procedure described with reference to FIG. 8, the UE send a message, including updated status information indicating that the WLAN module has been activated, to the BSS.

The BSS sends a message, including the updated status information, to the eNB through the WT. The eNB updates the state of the UE with the updated status information.

That is, the eNB recognizes that the WLAN module of the UE has shifted from the deactivation state to the activation state.

Through such a method, the eNB may recognize whether the WLAN modules of the UEs have been activated or deactivated.

FIG. 14 is a flowchart showing an example of a wake-up operation proposed by the present invention.

Referring to FIG. 14, if the WLAN module of a terminal has been deactivated, the terminal may activate the WLAN module and receive from an eNB.

Report Terminal State (S14010)

A terminal sends status information indicating the state of the terminal to an access point (AP).

The status information indicates the state in which the terminal enters after transmitting the status information and may be transmitted with a terminal ID (e.g., MAC ID and/or AID).

Furthermore, the status information indicates the OFF of a WLAN module included in the terminal.

Wake-Up Procedure (S14020, S14030)

When the WLAN module of the terminal is an OFF state, the terminal receives a specific packet for activating its WLAN module from the AP through a low power reception module (S14020).

The low power reception module is a module that operates with lower power in order to receive only a specific packet for activating the WLAN module as described above.

The specific packet may be called a Wake-Up Packet and may have the same structure and information as those described with reference to FIG. 10.

The terminal that has received the Wake-Up Packet from the AP activates the WLAN module based on the received specific packet (S14030). Specifically, the low power module that has received the specific packet from the AP transfers a signal (e.g., a Wake-Up signal) for making ON the WLAN module to the WLAN module. The WLAN module that has received the signal from the low power module becomes an ON state.

Update Terminal State (S14040)

The terminal that has activated the WLAN module sends a Response message indicative of the activation of the WLAN module to the AP as a response to the specific packet. The Response message may include updated status information indicating that the WLAN module has become the activation state. The eNB may receive the updated status information from the AP and update the state of the terminal.

Receive Data (S14050)

The terminal whose WLAN module has been activated may receive downlink data (LWA data or the LWIP data) from the AP through an unlicensed band using an LTE-WLAN aggregation.

FIG. 15 is a flowchart showing an example of an operation of an eNB for activating the WLAN module of a terminal, which is proposed by an embodiment of the present invention.

Referring to FIG. 15, if the WLAN module of a terminal has been deactivated, an eNB may activate the WLAN module of the terminal and send data to the terminal.

Report Terminal State (S15010)

The eNB receives status information indicating the state of at least one of terminals from an access point (AP).

The status information indicates the state in which at least one of the terminals enter after transmitting the status information and may be transmitted with at least one of terminals ID (e.g., MAC ID and/or AID) and a BSS ID to which the at least one of terminals belongs.

Also, the status information indicates the OFF of a WLAN module included in the BSS ID to which the at least one of the terminals belongs.

Wake-Up Procedure (S15020)

The eNB that has received the status information of the at least one terminal from the AP sends an Indication message that instructs the activation of the WLAN modules of terminals to the terminals including the WLAN modules in the OFF state through the AP in order to make ON the WLAN module of the OFF state.

The Indication message may have the flat structure or nested structure described with reference to FIG. 9, and may include a WT ID, BSS ID and at least one terminal ID.

Update Terminal State (S15030)

The eNB receives a Response message indicative of the activation of the WLAN module from the AP as a response to the Indication message. The Response message may include updated status information indicating that the WLAN module of the at least one terminal has become the activation state. The eNB may receive the updated status information from the AP and update the state of the at least one terminal with the received updated status information.

Receive Data (S15040)

The eNB may recognize that the WLAN module of the at least one terminal has been activated through the Confirmation message, and may send downlink data (LWA data or LWIP data) to the at least one terminal having the activated WLAN module through an unlicensed band using an LTE-WLAN aggregation.

FIG. 16 is a block diagram illustrating a wireless device in which methods as proposed herein may be implemented.

In this case, the wireless device may be a BS, UE, vehicle UE, a network entity, and the network entity includes at least one of eNB-type RSU or MME.

As shown in FIG. 16, the network entity 1610 and the UE (or the vehicle UE) 1620 include communication units (transmitting/receiving units, RF units, 1613 and 1623), processors 1611 and 1621, and memories 1612 and 1622.

The network entity and the UE may further input units and output units.

The communication units 1613 and 1623, the processors 1611 and 1621, the input units, the output units, and the memories 1612 and 1622 are operatively connected with each other in order to conduct the methods as proposed herein.

The communication units (transmitting/receiving units or RF units, 1613 and 1623), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1611 and 1621 implement functions, procedures, and/or methods as proposed herein. The layers of radio interface protocols may be implemented by the processors.

The processors may be represented as control parts, controllers, control units, or computers.

The memories 1612 and 1622 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

INDUSTRIAL APPLICABILITY

Examples in which the method for transmitting and receiving data using an LTE-WLAN aggregation by a terminal in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for transmitting and receiving data using an LTE (Long Term Evolution)-WLAN (Wireless Local Area Network) aggregation by a terminal in a wireless communication system, the method comprising:
   transmitting status information to an access point (AP),
   wherein the status information indicates that a wireless LAN module of the terminal is changed over to an OFF state after the terminal transmits the status information;
   receiving a specific packet for indicating an activation of the wireless LAN module from the AP, based on i) a first wake-up indication message is transmitted from a base station to a WLAN termination (WT), and ii) a second wake-up indication message is transmitted from the WT to the AP,
   wherein the first wake-up indication message includes i) a WT identifier (WT ID) for identifying the WT, ii) a basic service set identifier (BSSID) for identifying the AP and iii) a terminal identifier for identifying the terminal,
   wherein, based on the first wake-up indication message, the second wake-up indication message is generated to include i) the BSSID and ii) the terminal identifier,
   wherein, based on the second wake-up indication message, the specific packet is generated to include the terminal identifier;
   activating the wireless LAN module based on the specific packet;
   transmitting a response message to the AP indicating that the wireless LAN module is activated in response to the specific packet,
   wherein the response message includes the BSSID and the terminal identifier; and
   receiving downlink data through an unlicensed spectrum using the LTE-WLAN aggregation from the AP.

2. The method of claim 1, wherein the downlink data is transmitted through a specific bearer configured to transmit and receive data using the LTE-WLAN aggregation, and includes an identifier for identifying the specific bearer.

3. A method for transmitting and receiving data using an LTE-WLAN aggregation by a base station in a wireless communication system, the method comprising:
   receiving status information from an access point (AP),
   wherein the status information indicates that a wireless LAN module of at least one terminal is changed over to an OFF state after the at least one terminal transmits the status information;
   transmitting first wake-up indication message to a WLAN termination (WT) indicating activation of the wireless LAN module,
   wherein the first wake-up indication message includes i) a WT identifier (WT ID) for identifying the WT, ii) a basic service set identifier (BSSID) for identifying the AP and iii) a terminal identifier for identifying the at least one the terminal,
   wherein, based on the first wake-up indication message, a second wake-up indication message including i) the BSSID and ii) the terminal identifier is transmitted from the WT to the AP,
   wherein, based on the second wake-up indication message, a specific packet including the terminal identifier is transmitted from the AP to the at least one terminal;
   receiving third response message from the WT indicating whether the wireless LAN module is activated in response to the first wake-up indication message, based on that i) a first response message is transmitted from the at least one terminal to the AP and ii) a second response message is transmitted from the AP to the WT,
   wherein, based on the specific packet, the first response message is generated to include i) the BSSID and ii) the terminal identifier,
   wherein, based on the first response message, the second response message is generated to include i) the WT ID, ii) the BSSID and iii) the terminal identifier; and
   transmitting downlink data to the AP through an unlicensed spectrum using the LTE-WLAN aggregation based on the third response message.

4. The method of claim 3, further comprising checking the status of the at least one terminal based on the status information.

5. The method of claim 4, further comprising updating terminal status information indicating the status of the at least one terminal from off to on when the third response message indicates activation of a transmission/reception function.

6. The method of claim 3, wherein the first wake-up indication message is transmitted through an Xw-C interface representing an interface for transmitting and receiving control data,
   wherein the Xw-C interface is based on a control plane of an interface between the base station and the WT.

7. The method of claim 3, wherein the first wake-up indication message is a nested structure of a flat structure.

8. The method of claim 3, further comprising:
   transmitting a specific packet to the AP for activating a wireless LAN module included in the AP, when the wireless LAN module is inactive; and
   receiving a response message from the AP indicating whether to activate the wireless LAN module in response to the specific packet.

9. A terminal for transmitting and receiving data using an LTE-WLAN aggregation in a wireless communication system, the terminal comprising:
   a radio frequency (RF) module for transmitting and receiving a radio signal with an external device,
   wherein the RF module includes a Long Term Evolution module and a wireless LAN module; and
   a processor functionally connected to the RF module,
   wherein the processor is configured to:
      transmit status information to an access point (AP),
      wherein the status information indicates that a wireless LAN module of the terminal is changed over to an OFF state after the terminal transmits the status information,
      receive a specific packet for indicating an activation of the wireless LAN module from the AP, based on i) a first wake-up indication message is transmitted from a base station to a WLAN termination (WT), and ii) a second wake-up indication message is transmitted from the WT to the AP,
      wherein the first wake-up indication message includes i) a WT identifier (WT ID) for identifying the WT, ii)

a basic service set identifier (BSSID) for identifying the AP and iii) a terminal identifier for identifying the terminal,
wherein, based on the first wake-up indication message, the second wake-up indication message is generated to include i) the BSSID and ii) the terminal identifier,
wherein, based on the second wake-up indication message, the specific packet is generated to include the terminal identifier,
activate the wireless LAN module based on the specific packet,
transmit a response message to the AP indicating that the wireless LAN module is activated in response to the specific packet,
wherein the response message includes the BSSID and the terminal identifier, and
receive downlink data through an unlicensed spectrum using the LTE-WLAN aggregation from the AP.

\* \* \* \* \*